US011180141B2

(12) United States Patent
Ohmura

(10) Patent No.: US 11,180,141 B2
(45) Date of Patent: Nov. 23, 2021

(54) VEHICLE CONTROL SYSTEM

(71) Applicant: MAZDA MOTOR CORPORATION, Hiroshima (JP)

(72) Inventor: Hiroshi Ohmura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 201 days.

(21) Appl. No.: 16/466,584

(22) PCT Filed: Dec. 1, 2017

(86) PCT No.: PCT/JP2017/043307
§ 371 (c)(1),
(2) Date: Jun. 4, 2019

(87) PCT Pub. No.: WO2018/105524
PCT Pub. Date: Jun. 14, 2018

(65) Prior Publication Data
US 2019/0389461 A1    Dec. 26, 2019

(30) Foreign Application Priority Data

Dec. 5, 2016 (JP) .............................. JP2016-236023
Dec. 5, 2016 (JP) .............................. JP2016-236024

(51) Int. Cl.
*B60W 30/14* (2006.01)
*B60W 30/09* (2012.01)
(Continued)

(52) U.S. Cl.
CPC .......... *B60W 30/146* (2013.01); *B60W 30/09* (2013.01); *B60W 30/095* (2013.01);
(Continued)

(58) Field of Classification Search
None
See application file for complete search history.

(56) References Cited

U.S. PATENT DOCUMENTS 7,979,174 B2 * 7/2011 Fregene ............ B60W 50/0097
701/23
8,364,366 B2 * 1/2013 Foessel ................. B60W 30/09
701/70
(Continued)

FOREIGN PATENT DOCUMENTS

EP       2 648 172 A1    10/2013
JP     2011-051547 A     3/2011
(Continued)

OTHER PUBLICATIONS

The extended European search report issued by the European Patent Office dated Jun. 30, 2020, which corresponds to European Patent Application No. 17877847.8-1012 and is related to U.S. Appl. No. 16/466,584.

(Continued)

*Primary Examiner* — Robert T Nguyen
*Assistant Examiner* — Dylan M Katz
(74) *Attorney, Agent, or Firm* — Studebaker & Brackett PC

(57) ABSTRACT

Disclosed is a vehicle control system (ECU 10) provided in a vehicle (1) is configured be operable to: detect a preceding vehicle (3) ahead of the vehicle (1), and set, in at least a part of a region around the preceding vehicle (3), a speed distribution zone (40, 50) defining a distribution zone of an allowable upper limit ($V_{lim}$) of a relative speed of the vehicle (1) with respect to the preceding vehicle (3) in a traveling direction of the vehicle (1); and, when the vehicle (1) is within the speed distribution zone (40, 50), to execute traveling control of preventing the relative speed of the vehicle (1) with respect to the preceding vehicle (3) from exceeding the allowable upper limit $V_{lim}$, wherein, when the preceding vehicle (3) is located on a curved road (5), the speed distribution zone (50) is set such that, in a lateral region of the speed distribution zone, a constant relative (Continued)

speed line (d, e, f) connecting plural points each having a same value of the allowable upper limit ($V_{lim}$) is curved in conformity with a curvature of the curved road (5).

19 Claims, 10 Drawing Sheets

(51) Int. Cl.
  *B60W 30/095*  (2012.01)
  *B60W 30/10*  (2006.01)
  *B60W 30/16*  (2020.01)

(52) U.S. Cl.
  CPC ............ *B60W 30/10* (2013.01); *B60W 30/16* (2013.01); *B60W 2554/80* (2020.02)

(56) References Cited

U.S. PATENT DOCUMENTS

| | | | |
|---|---|---|---|
| 9,272,710 B2* | 3/2016 | Jeon | B60T 7/12 |
| 2002/0152015 A1* | 10/2002 | Seto | B60K 31/0008 |
| | | | 701/96 |
| 2011/0046813 A1* | 2/2011 | Castaneda | G05D 1/0033 |
| | | | 701/2 |
| 2012/0283895 A1 | 11/2012 | Noda | |
| 2013/0293395 A1 | 11/2013 | Ohama et al. | |
| 2015/0232090 A1 | 8/2015 | Jeon et al. | |
| 2016/0200317 A1* | 7/2016 | Danzl | B60W 10/10 |
| | | | 701/25 |
| 2017/0212513 A1 | 7/2017 | Iida et al. | |

FOREIGN PATENT DOCUMENTS

| | | |
|---|---|---|
| JP | 2016-037266 A | 3/2016 |
| WO | 2016/021340 A1 | 2/2016 |
| WO | 2016/024318 A1 | 2/2016 |

OTHER PUBLICATIONS

International Preliminary Report On Patentability and Written Opinion issued in PCT/JP2017/043307; dated Jun. 11, 2019.
International Search Report issued in PCT/JP2017/043307; dated Mar. 6, 2018.
Office Action issued in JP 2016-236023; mailed by the Japanese Patent Office dated Feb. 26, 2018.
Office Action issued in JP 2016-236024; mailed by the Japanese Patent Office dated Feb. 26, 2018.

* cited by examiner

VEHICLE CONTROL SYSTEM

TECHNICAL FIELD

The present invention relates to a vehicle control system, and more particularly to a vehicle control system for assisting a traveling of a vehicle.

BACKGROUND ART

Conventionally, there has been known a vehicle equipped with plural types of safe-driving support systems including a lane-keeping assist system and an automatic cruise system. Generally, in each of these systems, plural controls such as automatic brake control and/or steering assist control are used. Thus, there is a situation where different request signals such as a braking request signal for performing the automatic brake control and a steering request signal for performing the steering assist control are sent out from each of the systems. For example, there is a situation where the braking request signals are sent out, respectively, from different ones of the systems at different timings. In such situations, one request signal may be prioritized over plural request signals (see, for example, the following Patent Document 1).

CITATION LIST

Parent Document

Patent Document 1: Japanese Laid-Open Patent Publication: JP2011-051547A

SUMMARY OF INVENTION

Technical Problem

However, considering that the safe-driving support system tends to become more complicated in future, such a complicated safe-driving support system would not efficiently function as a whole only by giving priority to one request signal.

The present invention has been made to solve the above problem, and an object thereof is to provide a vehicle control system capable of efficiently performing a vehicle control for safe-driving support.

Solution to Technical Problem

In order to achieve the above object, the present invention provides a vehicle control system provided in a vehicle. The vehicle control system is configured be operable to: detect an object which presents ahead of the vehicle, set, in at least a part of a region around the object, a speed distribution zone defining a distribution of an allowable upper limit of a relative speed of the vehicle with respect to the object in a traveling direction of the vehicle; and execute traveling control of preventing the relative speed of the vehicle with respect to the object from exceeding the allowable upper limit when the vehicle is within the speed distribution zone, wherein, when the object is located on a curved road, the speed distribution zone is set such that a constant relative speed line connecting plural points each having a same value of the allowable upper limit has a curved area which is curved in conformity with a curvature of the road in at least one of opposite lateral regions of the speed distribution zone.

In the vehicle control system of the present invention having the above feature, a speed distribution zone is set in at least a part of a region around the object. In this speed distribution zone, an allowable upper limit of a relative speed of the vehicle with respect to the object is set. Then, the vehicle control system operates to control the relative speed of the vehicle with respect to the object to prevent exceeding the allowable upper limit set in the speed distribution zone. As above, in the present invention, since the vehicle control system is configured to restrict the allowable upper limit of the relative speed of the vehicle with respect to the object and integrally control a safe-driving support system such as automatic brake control and/or steering assist control, it is possible to provide safe-driving support based on simple and efficient speed control.

Further, in the present invention, when the object is located on a curved road, the speed distribution zone is set such that a constant relative speed line connecting plural points each having the same value of the allowable upper limit has a curved area which is curved in conformity with a curvature of the road in at least one of opposite lateral regions of the speed distribution zone. Here, when the road is curved, if the speed distribution zone is set in the same manner as that during traveling on a straight road, the speed distribution zone is possibly set such that a part thereof is set beyond a lane boundary line of the road. In this case, for example, even though the vehicle is traveling on a neighboring lane, a traveling speed of the vehicle is possibly restricted by the allowable upper limit set beyond the traveling lane of the vehicle, or a traveling course of the vehicle is possibly to be changed. This is unnecessary deceleration or steering avoidance for a passenger. Therefore, in the present invention, when the object is located on a curved road, the speed distribution zone is set such that a constant relative speed line connecting plural points each having a same value of the allowable upper limit has a curved area which is curved in conformity with a curvature of the road in at least one of opposite lateral regions of the speed distribution zone, so that it is possible to set the speed distribution zone in conformity to the shape of the road so as to avoid a situation where the vehicle undergoes unnecessary deceleration or steering. This makes it possible to provide driving support capable of enabling a passenger to feel secure and safe.

Preferably, in the vehicle control system of the present invention, when the vehicle is located at a position offset laterally with respect to a forward-rearward direction of the object, the speed distribution zone is set to have the curved area only in one of the lateral regions which is closer to the vehicle.

According to this feature, when the vehicle is located at a position offset laterally with respect to a forward-rearward direction of the object, the speed distribution zone is set to have the curved area only in one of the lateral regions which is closer to the vehicle. Here, when the vehicle is located offset laterally with respect to the forward-rearward direction of the object, a provability that the vehicle approaches the object in one of the lateral regions which is closer to the vehicle is higher than a provability that the vehicle approaches the object in the other lateral region which is farther from the vehicle. In the present invention, the speed distribution zone is set to have the curved area only in one of the lateral regions which is closer to the vehicle so that the speed distribution zone is set in conformity to the shape of the road only in a necessary region. Therefore, it is possible to realize secure and safe driving support by simple calculation processing.

Preferably, in the vehicle control system of the present invention, the speed distribution zone includes: an allowable upper limit-zero zone which is set at a position away from the object by a given distance and in which the allowable upper limit is set to be zero; and an entry prohibition zone which is set at a position closer to the object than the relative speed-zero zone and in which entry of the vehicle thereinto is prohibited.

According to this feature, the speed distribution zone includes an allowable upper limit-zero zone in which the allowable upper limit is set to be zero; and an entry prohibition zone in which entry of the vehicle thereinto is prohibited. Thus, for example, when the vehicle approaches the object, and enters the allowable upper limit-zero zone, the allowable upper limit of the relative speed is controlled to be zero, so that the vehicle does not approach the object any closer. In this way, the vehicle control system can support safe vehicle driving.

Further, the entry prohibition zone is set relative to the object. Thus, even if the vehicle further approaches the object within the allowable upper limit-zero zone due to an unexpected action of the object, etc., the vehicle is subjected to braking/steering control to prevent the vehicle from entering the entry prohibition zone. Therefore, when executing the braking/steering control for collision avoidance, a given distance can be ensured between the vehicle and the object, so that it becomes possible to support secure and safe driving without causing a passenger to feel less secure.

Preferably, in the vehicle control system of the present invention, the speed distribution zone includes an entry prohibition zone which is set at a position away from the object by a given distance and in which entry of the vehicle thereinto is prohibited, wherein, when the object is located on a curved road, the speed distribution zone is set in at least one of the lateral regions of the speed distribution zone such that the constant relative speed line extends along the entry prohibition zone beside the entry prohibition zone and the curved area is set forward and rearward of the entry prohibition zone.

According to this feature, when the object is located on a curved road, the speed distribution zone is set in at least one of the lateral regions of the speed distribution zone such that the constant relative speed line extends along the entry prohibition zone beside the entry prohibition zone and the curved area is set forward and rearward of the entry prohibition zone. Here, when the road is curved, if the speed distribution zone is set in the same manner as that during traveling on a straight road, the speed distribution zone is possibly set such that a part thereof is set beyond a lane boundary line of the road. In this case, for example, even though the vehicle is traveling on a neighboring lane, a traveling speed of the vehicle is possibly restricted by the allowable upper limit set beyond a traveling lane of the vehicle, or a traveling course of the vehicle is possibly changed. This is unnecessary deceleration or steering avoidance for a passenger. In the present invention, when the object is located on a curved road, the speed distribution zone is set in at least one of the lateral regions of the speed distribution zone such that the constant relative speed line extends along the entry prohibition zone beside the entry prohibition zone and the curved area is set forward and rearward of the entry prohibition zone. Therefore, it is possible to set the speed distribution zone in conformity to the shape of the road so as to avoid the situation where the vehicle undergoes unnecessary deceleration or steering. This makes it possible to provide driving support capable of enabling a passenger to feel secure and safe.

More preferably, in the above vehicle control system, the entry prohibition zone is set in an approximately rectangular shape, and when the object is located on a curved road, the speed distribution zone is set in at least one of the lateral regions of the speed distribution zone such that the constant relative speed line extends lineally and parallel to a lateral boundary line of the entry prohibition zone beside the entry prohibition zone and the curved area is set forward and rearward of the entry prohibition zone.

According to this feature, the entry prohibition zone is set in an approximately rectangular shape, so that it is possible to set the entry prohibition zone by simple calculation processing. Further, the curved area of the speed distribution zone is set forward and rearward of the entry prohibition zone, so that it is possible to prevent the speed distribution zone from protruding from the road. On the other hand, the speed distribution zone is set such that the constant relative speed line extends lineally and parallel to the lateral boundary line of the entry prohibition zone beside the entry prohibition zone. Therefore, it is possible to ensure a given distance between the lateral boundary line of the entry prohibition zone and the constant relative speed line, while preventing them from coming excessively close to each other. Here, assuming that the constant relative speed line is set at a small distance with respect to the entry prohibition zone, for example, when the vehicle approaches the object from the lateral side of the object, the vehicle may need to be rapidly decelerated. In the present invention, the speed distribution zone is set such that the constant relative speed line extends lineally and parallel to a lateral boundary line of the entry prohibition zone beside the entry prohibition zone, so that it is possible to avoid the above undesirable braking control. This makes it possible to provide more comfortable driving support capable of enabling a passenger to feel secure and safe.

Preferably, in the vehicle control system of the present invention, the entry prohibition zone is set to be more enlarged as a movement speed of the object becomes higher.

According to this feature, the entry prohibition zone is set such that it is more enlarged as the movement speed of the object becomes higher. Here, the present inventor found that, as the movement speed of the object becomes higher, a driver of the vehicle tends to take a larger distance with respect to the object, and drive the vehicle at a lower relative speed with respect to the object. Therefore, by setting the entry prohibition zone such that it is more enlarged as the movement speed of the object becomes higher, it becomes possible to provide driving support capable of enabling a passenger to feel secure and safe.

Preferably, in the vehicle control system of the present invention, when the vehicle is located at a position offset laterally with respect to a forward-rearward direction of the object, the speed distribution zone is set only in one of the lateral regions of the speed distribution zone which is closer to the vehicle such that the constant relative speed line extends along the entry prohibition zone and the curved area is set forward and rearward of the entry prohibition zone.

According to this feature, when the vehicle is located at a position offset laterally with respect to a forward-rearward direction of the object, the speed distribution zone is set only in one of the lateral regions of the speed distribution zone which is closer to the vehicle such that the constant relative speed line extends along the entry prohibition zone and the curved area is set forward and rearward of the entry prohibition zone. Here, when the vehicle is located offset laterally with respect to the forward-rearward direction of the object, a probability that the vehicle approaches the object in one of the lateral regions which is closer to the vehicle is higher than a probability that the vehicle approaches the object in the other lateral region which is farther from the vehicle. In the present invention, the speed distribution zone is set only in one of the lateral regions of the speed distribution zone which is closer to the vehicle such that the constant relative speed line extends along the entry prohibition zone. Therefore, it is possible to perform the setting of the speed distribution zone in conformity to the shape of the road, only in a necessary region, to realize secure and safe driving support by simple calculation processing.

Effect of Invention

The present invention can provide a vehicle control system capable of efficiently executing vehicle control for safe-driving support.

DESCRIPTION OF EMBODIMENTS

Figure 1:
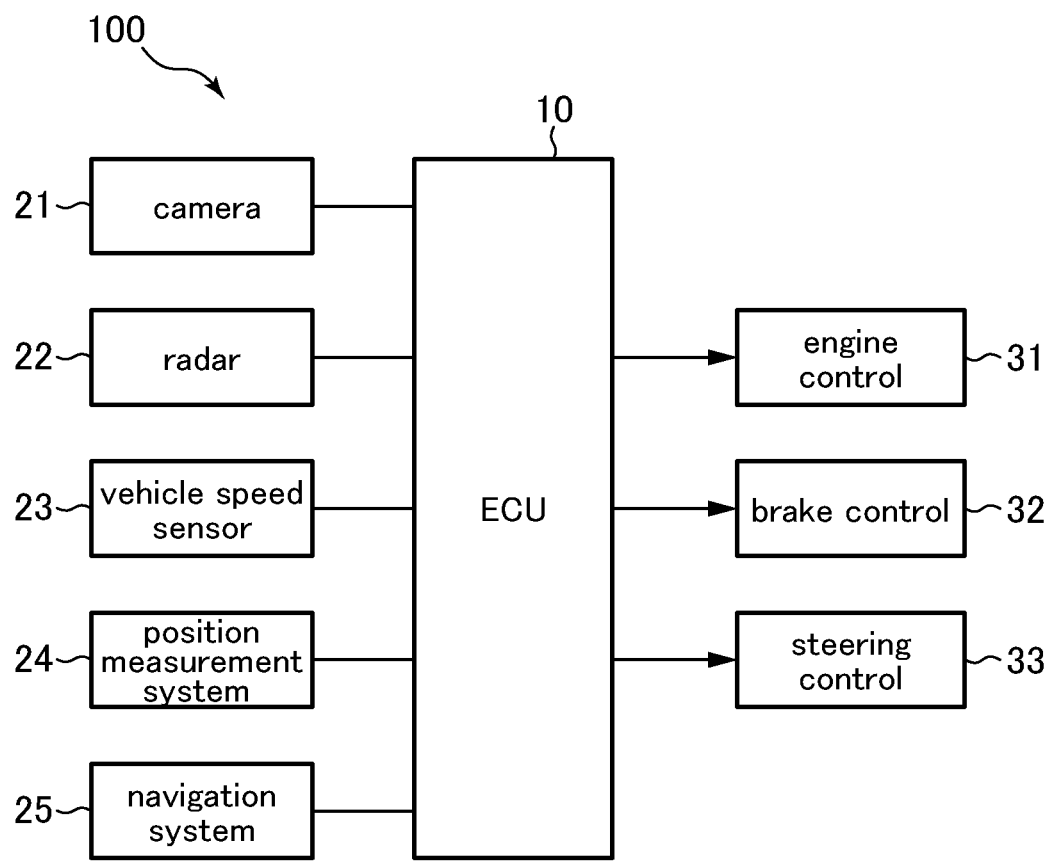
FIG. 1 is a block diagram of a vehicle control system according to a first embodiment of the present invention.

With reference to the accompanying drawings, preferred embodiments of the present invention will now be described. It should be noted here that, in description of a second embodiment and the subsequent description, the similar component or element as that in a first embodiment is assigned with the same reference numerals, and its description will be simplified or omitted.

First Embodiment

With reference to the accompanying drawings, a vehicle control system according to a first embodiment of the present invention will be described. First of all, with reference to FIG. 1, the configuration of the vehicle control system will be described. FIG. 1 is a block diagram of the vehicle control system.

As depicted in FIG. 1, the vehicle control system 100 is provided in a vehicle (own vehicle) 1 (see FIG. 3), and comprises a vehicle control device (ECU) 10, a plurality of sensors, and a plurality of control sub-systems. The plurality of sensors includes a vehicle-mounted camera 21, a millimeter-wave radar 22, a vehicle speed sensor 23, a position measurement system 24, and a navigation system 25. Further, the plurality of control sub-systems includes an engine control system 31, a brake control system 32 and a steering control system 33.

The ECU 10 is composed of a computer comprising a CPU, a memory storing various programs therein, and an input/output device, etc. The ECU 10 is configured to output request signals to the engine control system 31, the brake control system 32 and the steering control system 33 to suitably activate an engine system, a brake system and a steering system, respectively, based on the signals received from the plurality of sensors. For this purpose, the ECU 10 functionally comprises a data acquisition part, an object detection part, a position and relative speed calculation part, a road curvature calculation part, a speed distribution zone setting part, a course calculation part, and an avoidance control execution part.

The vehicle-mounted camera 21 takes images around the vehicle 1 and outputs taken image data. The ECU 10 identifies an object (e.g., a preceding vehicle) based on the image data. Here, the ECU 10 is capable of identifying a travelling direction or a forward-rearward direction of the object from the image data.

Further, the ECU 10 is operable, based on the image data from the vehicle-mounted camera 21, to acquire information indicative of an extending direction of a road on which the own vehicle is traveling and/or the object is located, such as a white line, a median strip, etc. defining the road. Then, the ECU 10 is operable, based on the acquired information, to calculate a curvature of the road. In this embodiment, the ECU 10 is operable to detect a white line on the road to recognize the position of the white line as an X-Y coordinate, and calculate the curvature of the road from a change amount of the X-Y coordinate. Here, instead of acquiring the curvature of the road from the image data, the curvature of the road may be calculated based on, e.g., road information recorded in the navigation system 25.

The millimeter-wave radar 22 is a measurement device for measuring the position and speed of the object, and transmits a radio wave (transmitted wave) to the forward of the vehicle 1 and receive a reflected wave produced as a result of reflection of the transmitted wave by the object. Then, the millimeter-wave radar 22 measures a distance between the vehicle 1 and the object, i.e., a vehicle-object distance, (e.g., inter-vehicle distance) and/or a relative speed of the object with respect to the vehicle 1 based on the transmitted wave and the received wave. In this embodiment, instead of the millimeter-wave radar 22, a laser radar, an ultrasonic sensor or the like may be used to measure the vehicle-object distance and the relative speed. Further, the position and speed measurement device may be composed using a plurality of other sensors.

The vehicle speed sensor 23 calculates an absolute speed of the vehicle 1.

The position measurement system 24 is a GPS system and/or a gyro system, and calculate the position of the vehicle 1 (current vehicle position information).

The navigation system 25 stores map information therein, and provides the map information to the ECU 10. Then, the ECU 10 identifies roads, traffic signals, buildings and others existing around the vehicle 1 (particularly, ahead of the vehicle 1 in the travelling direction) based on the map information and the current vehicle position information. Further, the ECU 10 may identify a landform which is difficult to be identified from the image data taken by the vehicle-mounted camera 21, such as a cliff, a trench or a hole based on the map information. The map information may be stored in the ECU 10.

The engine control system 31 is a controller for controlling an engine of the vehicle 1. When there is a need to accelerate or decelerate the vehicle 1, the ECU 10 outputs to the engine control system 31 an engine output change request signal for requesting to change an engine output.

The brake control system 32 is a controller for controlling a braking device of the vehicle 1. When there is a need to decelerate the vehicle 1, the ECU 10 outputs to the brake control system 32 a braking request signal for requesting to generate a braking force to be applied to the vehicle 1.

The steering control system 33 is a controller for controlling a steering device of the vehicle 1. When there is a need to change the travelling direction of the vehicle 1, the ECU 10 outputs to the steering control system 33 a steering direction change request signal for requesting to change a steering direction.

Next, speed control according to this embodiment in the vehicle control system 100 will be described.

Generally, when catching up with, or passing (or overtaking) an object (e.g., a preceding vehicle, a parked vehicle, or a guardrail) on or near a road, a driver of the vehicle keeps a given distance or clearance between the vehicle and the object in a travelling direction of the vehicle, and reduces the speed of the vehicle. Specifically, in order to avoid dangers such as a situation where a preceding vehicle suddenly changes a course, a situation where a pedestrian comes out from a blind spot along the road, and a situation where a door of a parked vehicle is suddenly opened, the relative speed with respect to the object is set to a lower value as the distance with respect to the object (vehicle-object distance) becomes smaller.

Further, generally, when the vehicle is approaching the object such as a preceding vehicle, from behind the object, the driver of the vehicle adjusts the vehicle speed (relative speed) according to the vehicle-object distance (longitudinal distance) along the travelling direction. Specifically, when the vehicle-object distance is large, an approaching speed (relative speed) is maintained high. However, when the vehicle-object distance becomes relatively small, the approaching speed is set to a lower value. Subsequently, at a given vehicle-object distance, the relative speed between the vehicle and the object becomes zero. This action is taken not only when the object is a preceding vehicle, but also when the object is a parked vehicle, a guardrail or the like.

As above, the driver drives the vehicle in such a manner so as to avoid dangers by ensuring the vehicle-object distance (including a lateral distance and a longitudinal distance) and the relative speed which allow the driver to feel that he/she can drive the vehicle safely with respect to the object, while taking into account a relationship between the vehicle-object distance and the relative speed.

Figure 2:
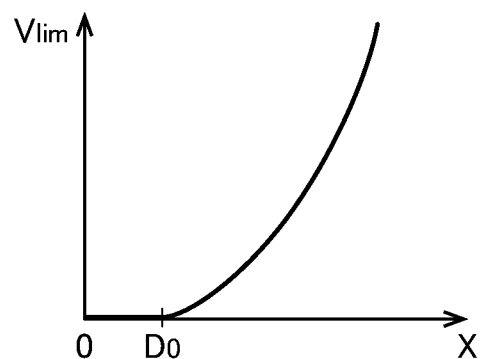
FIG. 2 is a graph presenting a relationship between an allowable upper limit of a relative speed of an own vehicle with respect to a target vehicle and their clearance, in the first embodiment.

FIG. 2 is an explanatory diagram depicting a relationship between an allowable upper limit of the relative speed with respect to the object and the vehicle-object distance (clearance), in the vehicle control system 100 according to this embodiment. As depicted in FIG. 2, when the vehicle 1 travels at a certain absolute speed, the allowable upper limit $V_{lim}$ set with respect to the object is 0 (zero) km/h when the vehicle-object distance X is less than to $D_0$ (safe distance), and quadratically increases when the vehicle-object distance X is equal to or greater than $D_0$ ($V_{lim}=k_0(X-D_0)^2$, where $X \geq D_0$). That is, for the purpose of ensuring safety, the relative speed of the vehicle 1 is set to zero when the vehicle-object distance X is equal to or less than $D_0$. On the other hand, when the vehicle-object distance X is equal to or larger than $D_0$, the vehicle 1 is capable to travel at a higher relative speed as the vehicle-object distance becomes larger.

In the example depicted in FIG. 2, the allowable upper limit with respect to the object is defined as $V_{lim}=f(X)=k_0(X-D_0)^2$. In this formula, $k_0$ denotes a gain coefficient related to the degree of change in $V_{lim}$ with respect to X, wherein $k_0$ is set depending on a type of the object, or the like.

In this embodiment, $V_{lim}$ is defined such that it includes the safe distance and is a quadratic function of X. Alternatively, $V_{lim}$ may be defined as another function (e.g., a linear function). Further, the allowable upper limit $V_{lim}$ may be set in a lateral direction or a longitudinal direction (forward or rearward direction) of the object, or may be set in all radial directions about the object. In doing so, the coefficient $k_0$ and the safe distance $D_0$ may be set with respect to the directions extending from the object.

In this embodiment, considering the allowable upper limit $V_{lim}$ as described above, the vehicle 1 is configured to set, in a region around the object (such as a preceding vehicle, a parked vehicle, a pedestrian, or a guardrail) detected by the vehicle 1, a two-dimensional distribution zone (speed distribution zone 40, 50) defining the allowable upper limit of the relative speed in the travelling direction of the vehicle 1 with respect to the object.

Figure 3:
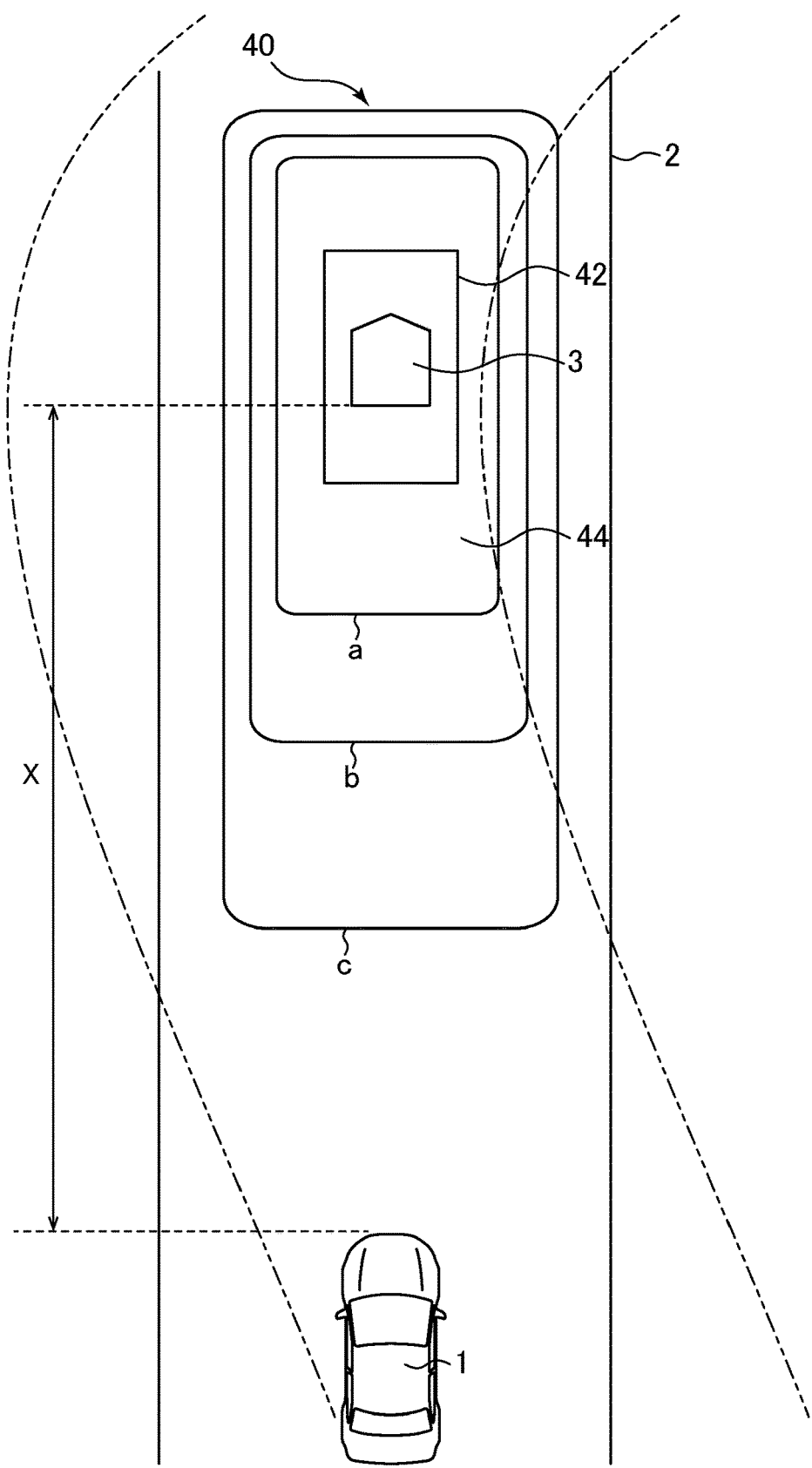
FIG. 3 is a diagram depicting a speed distribution zone which is set to the target vehicle when a traveling road is straight, in the vehicle control system according to the first embodiment.

FIG. 3 is an explanatory diagram of a speed distribution zone set with respect to a preceding vehicle 3 on a straight road 2 during a normal traveling by the vehicle control system 100 according to the first embodiment. As depicted in FIG. 3, in the speed distribution zone 40, the allowable upper limit $V_{lim}$ of the relative speed is set at each point around the preceding vehicle 3. That is, in the speed distribution zone 40, the allowable upper limit $V_{lim}$ of the relative speed is set over a region around the preceding vehicle 3 (in forward, lateral and rearward regions all around the preceding vehicle 3). During operation of the vehicle control system, the relative speed of the vehicle 1 with respect to the preceding vehicle 3 is restricted by the allowable upper limit $V_{lim}$ set within the speed distribution zone 40.

In the speed distribution zone 40, the allowable upper limit of the relative speed is set to be smaller as the lateral distance and the longitudinal distance from the preceding vehicle 3 become smaller (as the vehicle 1 approaches the preceding vehicle 3 more closely). In FIG. 3, for the sake of facilitating understanding, constant relative speed lines each connecting the same allowable upper limits are depicted. In this embodiment, the constant relative speed lines a, b, c correspond to lines on which the allowable upper limit $V_{lim}$ is 0 km/h, 20 km/h and 40 km/h, respectively.

Each of the constant relative speed lines a, b, c is formed in a corner-rounded approximately-rectangular shape, and disposed symmetrically with respect to the traveling direction, i.e., the forward-rearward (longitudinal) direction of the preceding vehicle 3. In each of the constant relative speed lines a, b, c, a front side and a rear side are disposed so as to extend parallel to the lateral direction of the preceding vehicle 3, and opposite lateral sides are disposed so as to extend parallel to the forward-rearward direction of the preceding vehicle 3. In the example depicted in FIG. 3, the preceding vehicle 3 is located on the straight road 2. Thus, in each of the constant relative speed lines a, b, c, the front and rear sides are disposed parallel to a direction orthogonal to the extending direction of the straight road 2, and the lateral sides disposed parallel to the extending direction of the straight road 2, i.e., the extending direction of a white line or a median strip.

Further, FIG. 3 depicts the speed distribution zone 40 in which the allowable upper limit is up to 40 km/h. However, the speed distribution zone 40 may be expanded to cover a higher relative speed considering the passing by an oncoming vehicle being traveling in an opposite lane.

Within this speed distribution zone 40, in a region around the preceding vehicle 3 inside the constant relative speed line a on which the allowable upper limit $V_{lim}$ is 0 km/h, an entry prohibition zone 42 in which entry of the vehicle 1 thereinto is prohibited, i.e., across which the vehicle 1 cannot further approach the preceding vehicle 3 is set.

Further, in a region outside the entry prohibition zone 42 and inside the constant relative speed line a on which the allowable upper limit $V_{lim}$ is 0 km/h, is set as a relative speed-zero zone 44 in which the allowable upper limit $V_{lim}$ of relative speed between the vehicle 1 and the preceding vehicle 3 is restricted to 0 km/h.

Here, the entry prohibition zone 42 and the relative speed-zero zone 42 will be described in detail.

Figure 4:
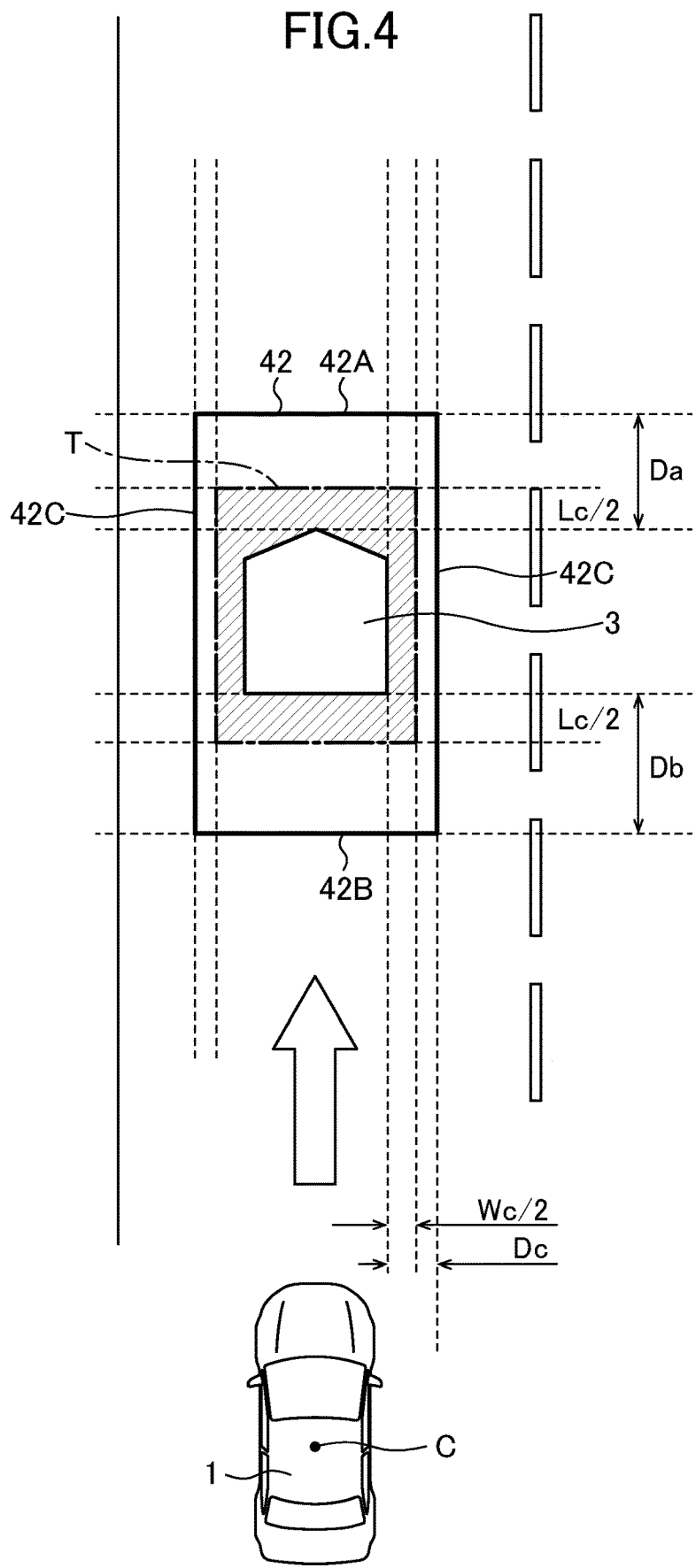
FIG. 4 is a diagram depicting an entry prohibition zone in the speed distribution zone, in the first embodiment.

FIG. 4 is a diagram depicting the entry prohibition zone 42 of the speed distribution zone 40. As depicted in FIG. 4, the entry prohibition zone 42 is a rectangular zone set around (all around) the preceding vehicle 3. The vehicle 3 is controlled so as not to enter the entry prohibition zone 42 in any situation. That is, the vehicle control system 100 is configured to perform braking control and/or steering control to set a target traveling course outside the entry prohibition zone 42 or decelerate the vehicle 1 outside the entry prohibition zone 42 to prevent the vehicle 1 from entering the entry prohibition zone 42 during driving support or collision avoidance control, etc.

The entry prohibition zone 42 is a zone surrounded by: a front boundary line 42A set ahead of the preceding vehicle 3 to serve as a front edge of the entry prohibition zone 42; a rear boundary line 42B set behind the preceding vehicle 3 to serve as a rear edge of the entry prohibition zone 42; and lateral boundary lines 42C set on right and left sides of the preceding vehicle 3 respectively to serve as lateral edges of the entry prohibition zone 42.

The front boundary line 42A of the entry prohibition zone 42 is set at a position away from a front end of the preceding vehicle 3 by a given forward distance Da. The given forward distance Da is determined by the following formula (1).

$$Da = Lc/2 + k_1 Vp + k_2 \quad (1)$$

In the formula (1), Lc denotes a longitudinal length (m) of the vehicle 1, and Vp denotes a traveling speed (m/s) of the preceding vehicle 3. Further, $k_1$ and $k_2$ denote constants. In this embodiment, $k_1$ and $k_2$ are set, respectively, to 0.5 and 5.

In this embodiment, the vehicle control system 100 is configured to recognize a center C of the vehicle 1 as the position of the vehicle 1. Therefore, in this embodiment, the given forward distance Da is calculated as a distance from the front end of the preceding vehicle 3 to the center C of the vehicle 1, by adding the term Lc/2 in the above formula (1), i.e., adding a length from the center C of the vehicle 1 to a rear end of the vehicle 1. Thus, for example, in a case where the given forward distance Da for determining the front boundary line 42A of the entry prohibition zone 42 is set as a distance from the front end of the preceding vehicle 3 to the rear end of the vehicle 1, the given forward distance Da is expressed as follows: $Da = k_1 Vp + k_2$.

In FIG. 4, positions at one-half (Lc/2) of the longitudinal length Lc from the front end and the rear end of the preceding vehicle 3, and positions at one-half (Wc/2) of a lateral length Wc of the vehicle 1 from the lateral ends of the preceding vehicle 3, are indicated as a rectangular-shaped contact zone T surrounded by the dash-dotted line.

The rear boundary line 42B of the entry prohibition zone 42 is set at a position away from the rear end of the preceding vehicle 3 by a given rearward distance Db. The given forward distance Da is determined by the following formula (2).

$$Db = Lc/2 + k_3 \quad (2)$$

In the formula (2), $k_3$ denotes a constant. In this embodiment, $k_3$ is set to 2.

In this embodiment, the vehicle control system 100 is configured to recognize the center C of the vehicle 1 as the position of the vehicle 1, as mentioned above. Therefore, in the formula (2), the given rearward distance Db is set as a distance from the rear end of the preceding vehicle 3 to the center C of the vehicle 1. Thus, for example, in a case where the given rearward distance Db for determining the rear boundary line 42B of the entry prohibition zone 42 is set as a distance from the rear end of the preceding vehicle 3 to the front end of the vehicle 1, the given rearward distance Db is expressed as follows: Db=2.

As above, in this embodiment, the given rearward distance Db for determining the rear boundary line 42B of the entry prohibition zone 42 is a constant value. However, it may be set to be variable according to the traveling speed of the vehicle 1, the traveling speed of the preceding vehicle 3, or the like.

Each of the lateral boundary lines 42C of the entry prohibition zone 42 is set at a position away from a lateral end of the preceding vehicle 3 by a given lateral distance Dc. The given lateral distance Dc is determined by the following formula (3).

$$Dc = Wc/2 + k_4 Vp + k_5 \quad (3)$$

In the formula (3), Wc denotes a lateral length (m) of the vehicle 1, and Vp denotes the traveling speed (m/s) of the preceding vehicle 3. Further, $k_4$ and $k_5$ denote constants. In this embodiment, $k_4$ and $k_5$ are set, respectively, to 0.1 and 0.5.

In this embodiment, the vehicle control system 100 is configured to recognize the center C of the vehicle 1 as the position of the vehicle 1, as mentioned above. Therefore, in the formula (3), the given lateral distance Dc is set as a distance from the lateral end of the preceding vehicle 3 to the center C of the vehicle. Thus, for example, in a case where the given lateral distance Dc for determining the lateral boundary line 42C of the entry prohibition zone 42 is set as a distance from the lateral end of the preceding vehicle 3 to the lateral end of the vehicle 1, the given lateral distance Dc is expressed as follows: $Dc = k_4 Vp + k_5$.

Here, each of the given forward distance Da, the given rearward distance Db and the given lateral distance Dc corresponds to the safe distance $D_0$ described in connection with FIG. 2. However, each of these distances Da, Db, Dc is not set merely as an inter-vehicle distance allowing the vehicle 1 to avoid collision with the preceding vehicle 3, but set as an inter-vehicle distance allowing a passenger of the vehicle 1 to feel safe.

Further, comparing the formula (1) with the formula (2), the forward distance Da of the entry prohibition zone 42 is set such that it is always larger than the rearward distance Db.

Further, as presented in the formula (1) and the formula (3), each of the forward distance Da and the lateral distance Dc is set such that it changes according to the traveling speed of the preceding vehicle 3. More specifically, each of the forward distance Da and the lateral distance Dc is set such that it becomes larger as the traveling speed Vp of the preceding vehicle 3 becomes higher. Therefore, the entry prohibition zone 42 is set such that it is more enlarged as the traveling speed Vp (movement speed) of the preceding vehicle 3 becomes higher.

Next, the relative speed-zero zone 44 will be described. As depicted in FIG. 3, the relative speed-zero zone 44 is an approximately rectangular-shaped zone having arc-like four corners. The relative speed-zero zone 44 is disposed outside the entry prohibition zone 42 and surrounded by the constant relative speed line a. In this embodiment, the vehicle control system 100 is configured to execute braking control to the vehicle 1, such that the relative speed between the vehicle 1 and the preceding vehicle 3 becomes negative, i.e., the traveling speed of the vehicle 1 becomes lower than the traveling speed of the preceding vehicle 3 when the vehicle 1 enters the inner region of the relative speed-zero zone 44. Through this braking control, when entering the relative speed-zero zone 44, the vehicle is controlled to move out of the relative speed-zero zone 44, i.e., move away from the preceding vehicle 3.

When the entry prohibition zone 42 is changed in response to a change in the traveling speed Vp of the preceding vehicle 3, the relative speed-zero zone 44 and a peripheral region of the speed distribution zone 40 are also changed accordingly. That is, for example, when the forward distance Da of the entry prohibition zone 42 is increased, a forward distance of each of the relative speed-zero zone 44 and the peripheral region of the speed distribution zone 40 is also increased, and a distance between the front boundary line 42A of the entry prohibition zone 42 and each of the front sides of the constant relative speed lines a, b, c is increased.

Next, a speed distribution zone 50 to be set around the preceding vehicle 3 when the preceding vehicle 3 is located on a curved road 5 will be described.

Figure 5:
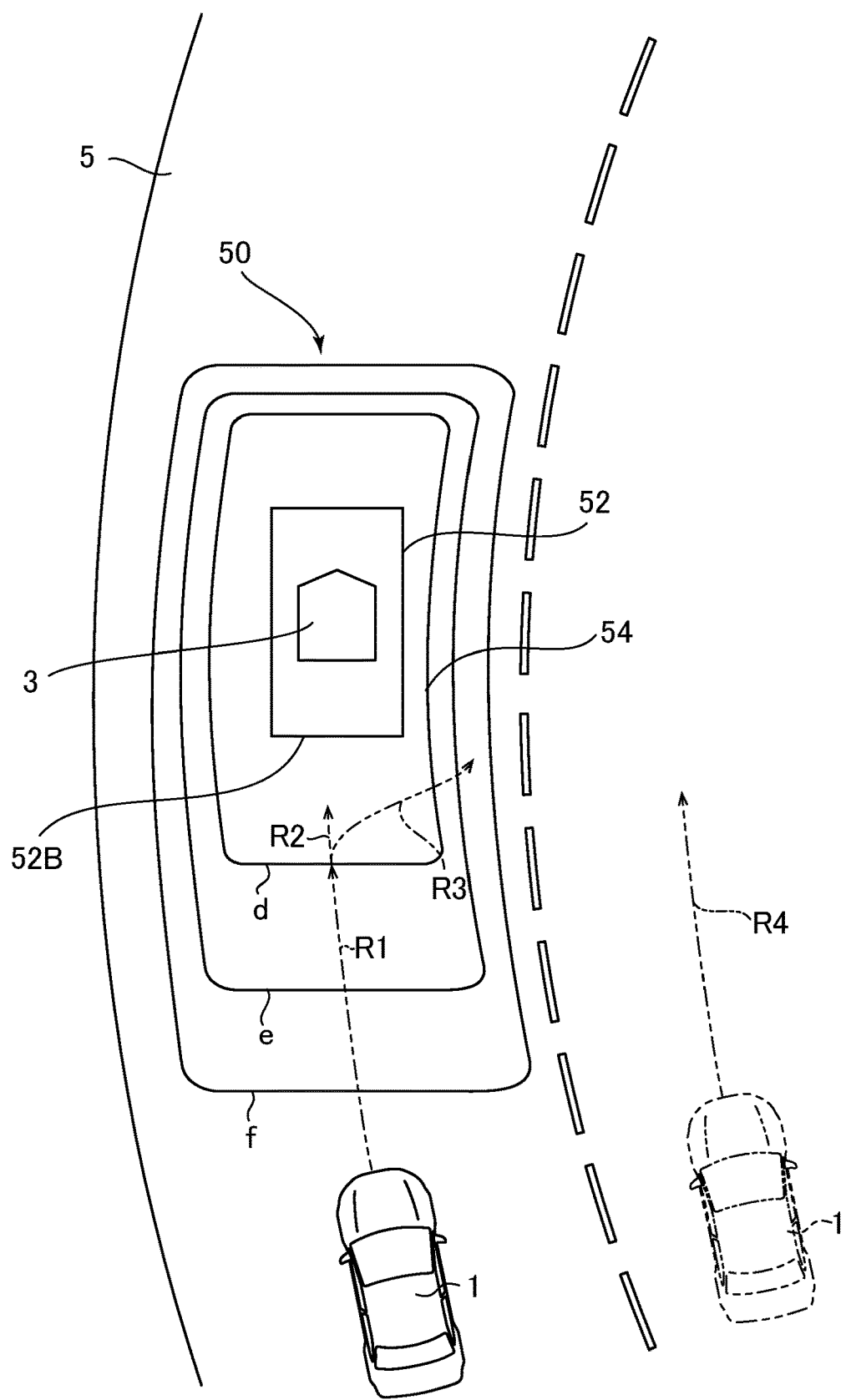
FIG. 5 is a diagram depicting a speed distribution zone which is set when a traveling road is curved, in the vehicle control system according to the first embodiment.

FIG. 5 is an explanatory diagram of the speed distribution zone 50 which is set to the preceding vehicle by the vehicle control system according to the first embodiment, when the vehicle 1 and the preceding vehicle 3 are located on the curved road 5 during normal traveling. As depicted in FIG. 5, similar to the speed distribution zone 40 to be set during traveling on the straight road 2, in the speed distribution zone 50, the allowable upper limit of the relative speed is set such that it becomes smaller as the lateral distance and the longitudinal distance from the preceding vehicle 3 become smaller (as the vehicle 1 approaches the preceding vehicle 3 more closely). In FIG. 5, for the sake of facilitating understanding, constant relative speed lines each connecting the same value of the allowable upper limits are depicted. In this embodiment, the constant relative speed lines d, e, f correspond, respectively, to three lines on which the allowable upper limit $V_{lim}$ is 0 km/h, 20 km/h, and 40 km/h.

Within this speed distribution zone 50, in a region around the preceding vehicle 3 inside the constant relative speed line d on which the allowable upper limit $V_{lim}$ is 0 km/h, an entry prohibition zone 52 is set in which entry of the vehicle 1 thereinto is prohibited, i.e., across which the vehicle 1 cannot approach the preceding vehicle 3. The entry prohibition zone 52 is an approximately rectangular zone set in the same manner as that for the entry prohibition zone 42 to be set when the preceding vehicle 3 is located on the straight road 2.

Further, a front side and a rear side of each of the constant relative speed lines d, e, f arranged on an outer side of the speed distribution zone 50 are disposed parallel to the lateral direction of the preceding vehicle 3, in the same manner as that for the front side and the rear side of each of the constant relative speed lines a, b, c to be set during traveling on the straight road 2. Further, length of the front and rear sides of each of the constant relative speed lines d, e, f are set in the same manner as that for the front and rear sides of each of the constant relative speed lines a, b, c, and the front and rear edges of each of the constant relative speed lines d, e, f are disposed at positions symmetric with respect to the preceding vehicle 3. On the other hand, in each of opposite lateral regions of the speed distribution zone 50, a lateral side of each of the constant relative speed lines d, e, f is curved with a curvature corresponding to a curvature of the curved road 5, more specifically with a curvature equal to the curvature of the curved road 5 so as to connect respective ends of the front and rear sides of the constant relative speed lines d, e, f. Further, four corners of each of the constant relative speed lines d, e, f are formed in an arc shape in the same manner as that for the speed distribution zone 40 to be set when the preceding vehicle 3 is located on the straight road 2. Thus, in each of the opposite lateral regions of the speed distribution zone 50, the speed distribution zone 50 is set to have a curved area in which each of the constant relative speed lines a, b, c is curved in conformity with a curvature of the curved road 5.

Here, a region outside the entry prohibition zone 52 and inside the constant relative speed line d on which the allowable upper limit $V_{lim}$ is 0 km/h is set as a relative speed-zero zone 54 in which the allowable upper limit $V_{lim}$ of relative speed between the vehicle 1 and the preceding vehicle 3 is restricted to 0 km/h. Thus, the relative speed-zero zone 54 is formed as a region having a shape in which a front edge and a rear edge thereof extend parallel to the lateral direction of the preceding vehicle, and each of opposite lateral edges thereof is curved with a curvature corresponding to the curvature of the curved road 5, more specifically with a curvature equal to the curvature of the curved road 5, i.e., formed as a curved area.

It should be noted here that, instead of the above calculation method, the speed distribution zone 40, 50 can be set based on various parameters. Examples of such parameters may include the relative speed between the vehicle 1 and the object, the type of the object, the travelling direction of the vehicle 1, the travelling direction and the moving speed of the object, the length of the object, the absolute speed of the vehicle 1. Specifically, a coefficient k and a calculation formula may be selected based on these parameters.

Further, the speed distribution zone 40, 50 can be set with respect to various objects. Examples of the objects include a vehicle, a pedestrian, a bicycle, a travelling path partition member, an obstacle, a traffic signal, and a traffic sign. The vehicle can be identified between a passenger vehicle, a truck, and a motorcycle. The pedestrian can be identified between an adult, a child and a group. Examples of the travelling path partition member include a guardrail, a road shoulder forming a step at a lateral edge of a traveling road, a center median, and a lane line. Examples of the obstacle include a cliff, a trench, a hole and a fallen object. Examples of the traffic sign include a halt line and a halt sign.

Figure 6:
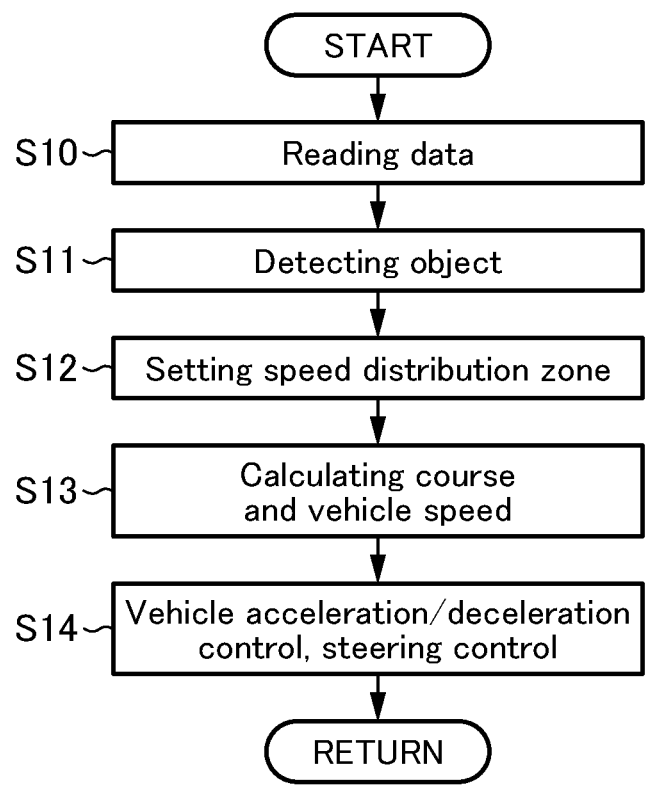
FIG. 6 is a flow chart of processing in the vehicle control system according to the first embodiment.

Next, with reference to FIG. 6, a flow of processing to be executed by the vehicle control system according to this embodiment will be described. FIG. 6 is a flow chart of processing by the vehicle control device.

As shown in FIG. 6, when the vehicle 1 is travelling on a travelling road, the ECU 10 (data acquisition part) of the vehicle 1 acquires a variety of data from the plurality of sensors (S10). Specifically, the ECU 10 receives from the vehicle-mounted camera 21 image data of a view in front of the vehicle 1 taken by the vehicle-mounted camera 21, and receives measurement data from the millimeter-wave radar 22.

The ECU 10 (object detection part) processes data acquired from external sensors including at least the vehicle-mounted camera 21 to detect an object (S11). Specifically, the ECU 10 executes image processing for the image data to detect a preceding vehicle 3 as the object. Simultaneously, the type of the objects (in this case, vehicle) is identified. Further, the ECU 10 may be configured to detect the presence of a specific obstacle from the map information.

Further, the ECU 10 (position and relative speed calculation part) calculates the position and the relative speed of the detected object (preceding vehicle 3) with respect to the vehicle 1 based on the measurement data. Here, the position of the object includes a longitudinal position (longitudinal distance) along the traveling direction of the vehicle 1, and a lateral position (lateral distance) along the lateral direction orthogonal to the traveling direction. A relative speed contained in the measurement data may be directly used as the relative speed, or a component of velocity along the traveling direction may be calculated from the measurement data. Further, although a component of velocity orthogonal to the travelling direction does not necessarily need to be calculated, it may be estimated from plural pieces of measurement data and/or plural pieces of image data, as needed.

Further, the ECU (road curvature calculation part) operates to identify a white road on the road based on the image data from the vehicle-mounted camera 21, and calculate a curvature of the road based on the position of the identified white line.

The ECU 10 (speed distribution zone setting part) operates to set one of the speed distribution zones 40, 50 with respect to the detected object (i.e., the preceding vehicle 3), according to the calculated curvature of the road (S12). Here, when the road is straight, the curvature of the road is 0. Thus, the approximately rectangular speed distribution zone 40 as depicted in FIG. 3 is set in which the curvature of each of the lateral sides of the constant relative speed lines a, b, c is 0. On the other hand, when the road is curved, the curvature of the road has a value other than 0. Thus, the speed distribution zone 50 as depicted in FIG. 5 is set in which each of the lateral sides of the constant relative speed lines d, e, f is curved with a curvature equal to the curvature of the road. That is, in each case, each of the lateral sides of the constant relative speed lines in the speed distribution zone is disposed with a curvature equal to the curvature of the road.

Then, the ECU 10 (course calculation part) calculates a course along which the vehicle 1 can travel, and a setup vehicle speed or target speed at each position on the course (S13) based on the set speed distribution zone 40, 50. Then, in order to enable the vehicle 1 to travel along the calculated course, the ECU 10 (travel control execution part) executes travel control (S14).

The processing flow in FIG. 6 is repeatedly executed at intervals of a given time period (e.g., 0.1 seconds). Thus, the course and the setup speed at each position on the course to be calculated will change with time.

Here, the speed control of the vehicle 1 in a situation where the vehicle 1 approaches the preceding vehicle 3 from the behind when the vehicle 1 and the preceding vehicle 3 are traveling on a curved road 5 will be described.

As indicated by a course R1 in FIG. 5, when the vehicle 1 approaches the preceding vehicle 3 from the behind, the vehicle 1 travels across the constant relative speed lines f, e, d of the speed distribution zone 50. In this situation, for example, assuming that the vehicle 1 is traveling at 40 km/h, the vehicle 1 can maintain this traveling speed before the constant relative speed line f. However, after the vehicle 1 moves beyond the constant relative speed line f, the allowable upper limit $V_{lim}$ gradually decreases, so the vehicle control system 100 outputs the braking request signal to the brake control system 32 to decelerate the vehicle 1, thereby controlling the vehicle 1 to prevent the vehicle speed thereof from exceeding the allowable upper limit $V_{lim}$ set at each point on the course.

When the vehicle 1 reaches an outer boundary of the relative speed-zero zone 54, the vehicle 1 is controlled such that the relative speed between the vehicle 1 and the preceding vehicle 3 becomes 0 (zero). Thus, in a normal driving state, the vehicle 1 does not approach the preceding vehicle 3 any more.

However, for example, when the preceding vehicle 3 is unexpectedly decelerated, the vehicle 1 may enter the relative speed-zero zone 54. In this situation, the vehicle control system 100 controls the vehicle 1 so as to move the vehicle 1 out of the relative speed-zero zone 54. More specifically, the vehicle control system 100 outputs the braking request signal such that the relative speed between the vehicle 1 and the preceding vehicle 3 becomes negative, i.e., becomes less than 0 km/h, thereby controlling the vehicle 1 to move away from the preceding vehicle 3.

Further, when the vehicle 1 enters the relative speed-zero zone 54, the vehicle control system 100 controls the speed and/or the traveling course of the vehicle 1 to prevent the vehicle 1 from entering the entry prohibition zone 52. Specifically, as indicated by a course R2 in FIG. 5, when only the speed of the vehicle 1 is controlled, the vehicle control system 100 determines a braking force for the vehicle 1 such that the vehicle 1 travels outside (behind) the rear boundary line 52B of the entry prohibition zone 52 without moving beyond the rear boundary line 52B, and output the braking request to the brake control system. As a result, although the vehicle 1 most closely approaches the preceding vehicle 3 at a position outside the entry prohibition zone 52, the vehicle 1 does not approach the preceding vehicle 3 any more and does not enter the entry prohibition zone 52.

As above, the vehicle control system 100 is configured to, when the vehicle 1 enters the relative speed-zero zone 54, control the vehicle 1 such that it is decelerated so as to be located behind the rear boundary line 52B of the entry prohibition zone 52. However, control to be executed in such a situation is not limited thereto. For example, the vehicle control system 100 may be configured to perform, in addition to the speed control, the steering control so as to avoid collision with the preceding vehicle 3. In this case, the vehicle control system 100 may be configured to set a target traveling course outside the entry prohibition zone 42, for example, as indicated by a course R3 in FIG. 5.

Further, the speed distribution zone 50 set around the preceding vehicle 3 does not protrude from a lane on which the preceding vehicle 3 is located. Thus, even in a situation when the vehicle 1 is traveling on a lane next to, e.g., on the right side of the lane of the preceding vehicle 3, as indicated by the two-dot chain line in FIG. 5, the vehicle 1 can travel on the neighboring lane without being restricted by the allowable upper limit $V_{lim}$ of the speed distribution zone 50 (e.g., course R4).

The vehicle control system according to the first embodiment can bring out the following advantageous effects.

The ECU 10 operates to set one of the speed distribution zones 40, 50 around the preceding vehicle 3, therefore, it is possible to restrict the allowable upper limit $V_{lim}$ of the relative speed of the vehicle 1 with respect to the preceding vehicle 3, and integrally control a safe-driving support system such as automatic brake control and steering assist control, therefore, it is possible to provide safe-driving support based on simple and efficient speed control.

When the preceding vehicle 3 is located on a curved road 3, the ECU 10 operated to set the speed distribution zone 50 such that the speed distribution zone 50 has, in a lateral region of the preceding vehicle 3, a curved area in which each of the constant relative speed lines d, e, f is curved in conformity with the curvature of the curved road 5, therefore it is possible to prevent the speed distribution zone 50 from protruding from a lane of the road on which the preceding vehicle 3 is located.

Here, for example, when the road is curved as indicated by the two-dot chain line in FIG. 3, if the speed distribution zone 40 is set in the same manner as that during traveling on the straight road 2, the speed distribution zone 40 is likely to be set such that a part thereof, particularly a part of one of the lateral regions thereof, protrudes beyond a lane boundary line of the road. In this situation, if the vehicle 1 is traveling on a lane on the right side of the lane of the preceding vehicle 3, the traveling speed or course of the vehicle 1 is undesirably restricted or changed by the allowable upper limit $V_{lim}$ set around the preceding vehicle 3 and protrude into the traveling lane of the vehicle 1. Particularly, in the example depicted in FIG. 3, the width of each of the constant relative speed lines a, b, c in the lateral region of the speed distribution zone 40 is relatively narrow, so that the vehicle 1 is obliged to undergo rapid deceleration or course change. Such traveling control causes unnecessary deceleration or steering avoidance for a passenger of the vehicle 1 which is traveling on a lane next to that of the preceding vehicle, and results in traveling support bring a feeling of strangeness.

In the above embodiment, when the preceding vehicle 3 is located on a curved road 5 each of the constant relative speed lines d, e, f is set to have a curved area which is curved in conformity with a curvature of the curved road, in a region laterally beside the preceding vehicle 3, i.e., in the lateral regions of the speed distribution zone 50, so that it is possible to set the speed distribution zone 50 in conformity to the shape of the road to prevent the speed distribution zone 50 from protruding into a neighboring lane. This also makes it possible to avoid the situation where the vehicle 1 which is traveling on a neighboring lane undergoes unnecessary deceleration or steering. Therefore, the vehicle control system 100 according to this embodiment can provide driving support capable of enabling a passenger to feel secure and safe.

Each of the speed distribution zones 40, 50 includes the allowable upper limit-zero zone (44, 54) and the entry prohibition zone (42, 52), whereby in a normal driving state, the relative speed of the vehicle 1 with respect to the preceding vehicle 3 is kept at zero, at the position on the boundary line of each of the relative speed-zero zone (44, 54). Thus, the vehicle control system 10 allows the vehicle to travel while keeping a given distance from the preceding vehicle 3, so that it is possible to perform safe-driving support.

Further, even if the vehicle 1 enters the relative speed-zero zone (44, 54) and further approaches the preceding vehicle 3 due to an unexpected deceleration of the preceding vehicle 3, etc., the vehicle control system 100 operates to subject the vehicle 1 to deceleration/steering control to prevent the vehicle 1 from entering the entry prohibition zone (42, 52), so that, even when executing collision avoidance control, a given distance can be ensured between the vehicle 1 and the preceding vehicle 3. Therefore, it is possible to prevent a passenger from feeling less secure so as to support secure and safe driving.

The entry prohibition zone (42, 52) is set such that it is changed according to the traveling speed Vp of the preceding vehicle 3, more specifically, it is more enlarged as the traveling speed Vp of the preceding vehicle 3 becomes higher. Here, the present inventor found that, the distance and relative speed between the vehicle 1 and the preceding vehicle 3 to be ensured to enable a passenger of the vehicle 1 to feel secure and safe vary according to the traveling speed Vp of the preceding vehicle. More specifically, as the traveling speed of the preceding vehicle 3 becomes higher, a driver of the vehicle 1 tends to take a larger distance with respect to the preceding vehicle 3, and drive the vehicle 1 at a lower relative speed with respect to the preceding vehicle 3. Therefore, in this embodiment, the entry prohibition zone (42, 52) is set such that it is more enlarged according to the traveling speed Vp of the preceding vehicle 3 as the traveling speed Vp becomes higher, so that it is possible to ensure the distance and relative speed fitting to a passenger of the vehicle 1, with respect to the preceding vehicle 3, to perform driving support for enabling the passenger of the vehicle 1 to feel secure and safe.

Second Embodiment

Next, a vehicle control system according to a second embodiment of the present invention will be described. The vehicle control system according to the second embodiment is different from the vehicle control system according to the first embodiment, in terms of setting of the speed distribution zone to be set around a stopped vehicle 6 as the object. Except for this difference, the vehicle control system according to the second embodiment has the same configuration as that of the vehicle control system according to the first embodiment.

Figure 7:
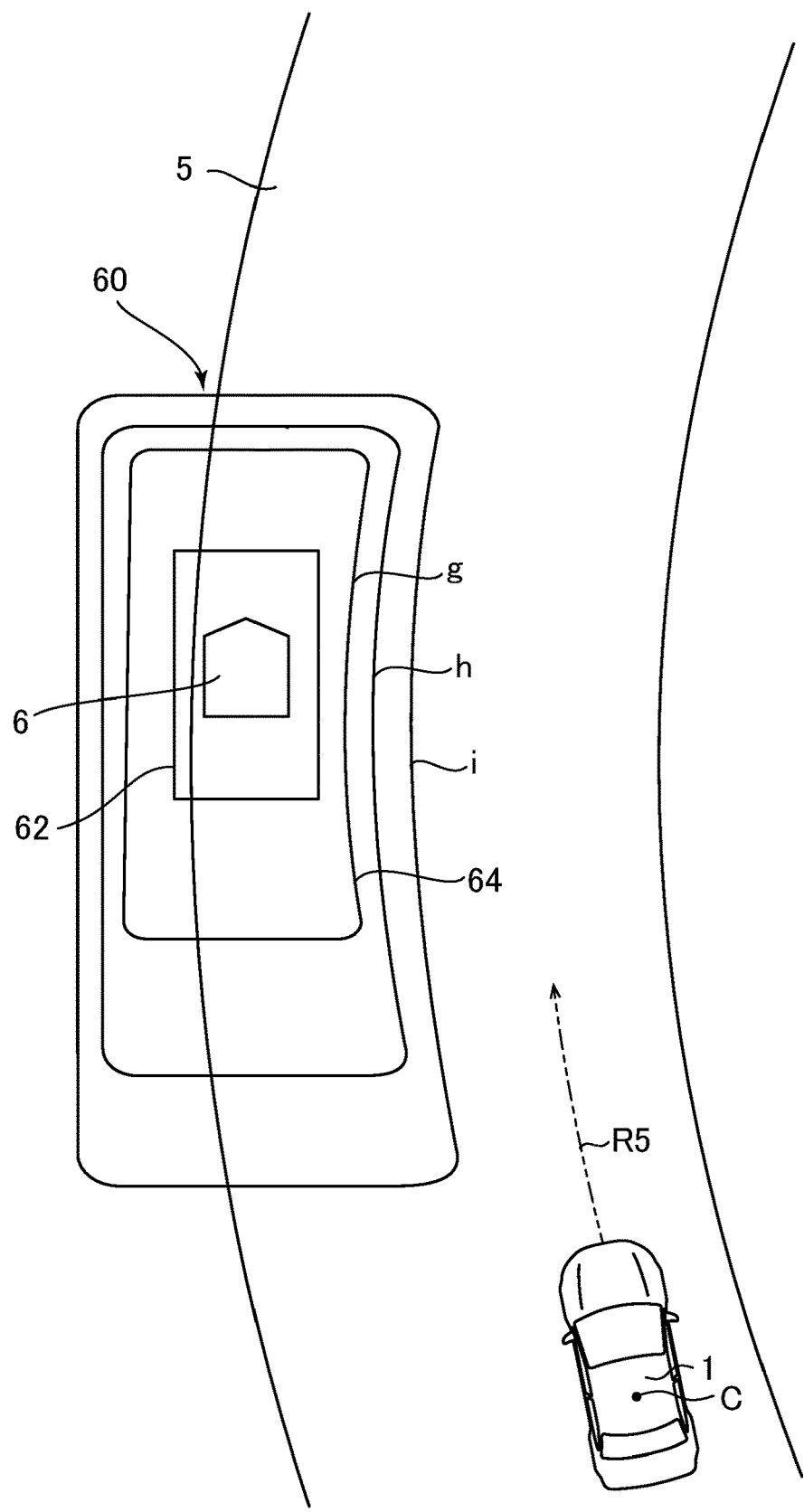
FIG. 7 is a diagram depicting a speed distribution zone which is set to a stopped vehicle, in a vehicle control system according to a second embodiment of the present invention.

FIG. 7 is a diagram depicting a speed distribution zone 60 which is set to a stopped vehicle 6, in the vehicle control system 100 according to the second embodiment. In this embodiment, the stopped vehicle 6 is stopped at an end (left end) on the curved road 5. Thus, the vehicle 1 which is traveling on the road 5 is located offset laterally with respect to the traveling direction (forward-rearward direction) of the stopped vehicle 6. When the vehicle 1 is located offset laterally with respect to the forward-rearward direction of the stopped vehicle 6, the ECU is operable to set a speed distribution zone 60 to have opposite lateral regions laterally beside the stopped vehicle 6, wherein only one of the lateral regions which is closer to the vehicle 1 is formed with a curved area in which a constant relative speed line is curved in conformity with a curvature of the road.

Here, the ECU 10 is operable, when one (left end, in the example depicted in FIG. 7) of opposite lateral ends of the vehicle 1 is located at a position of one (right end, in the example depicted in FIG. 7) of opposite lateral ends of the stopped vehicle 6, or at a position further laterally (rightwardly, in the example depicted in FIG. 7) away from the stopped vehicle 6, to determine that the vehicle 1 is located offset with respect to the stopped vehicle 6. Alternatively, the ECU 10 may be configured to be operable, when the center C of the vehicle 1 is located at a position of the lateral end (right end, in the example depicted in FIG. 7) of the stopped vehicle 6, or at a position further laterally away from the stopped vehicle 6, to determine that the vehicle 1 is located offset with respect to the stopped vehicle 6.

As with the speed distribution zone 50 in the first embodiment, in the speed distribution zone 60, the allowable upper limit of the relative speed is set such that it becomes smaller as the lateral distance and the longitudinal distance from the stopped vehicle 6 become smaller (as the vehicle 1 approaches the stopped vehicle 6 more closely). In FIG. 7, for the sake of facilitating understanding, three constant relative speed lines each connecting the same value of the allowable upper limits are depicted. In this embodiment, the constant relative speed lines g, h, i correspond, respectively, to three lines on which the allowable upper limit $V_{lim}$ is 0 km/h, 20 km/h, and 40 km/h.

Here, front, rear and left sides of each of the constant relative speed lines g, h, i are arranged in the same manner as that for the front, rear and left sides of each of the constant relative speed lines a, b, c of the speed distribution zone 40 in the first embodiment. On the other hand, one of the lateral sides of each of the constant relative speed lines g, h, i to which the vehicle 2 is located closer, i.e., the right side of each of the constant relative speed lines g, h, i, is curved with a curvature corresponding to the curvature of the curved road 5, more specifically with a curvature equal to the curvature of the curved road 5, while connecting respective ends of the front and rear sides of the constant relative speed line, as with the speed distribution zone 50 in the first embodiment. Thus, one of the lateral regions of the speed distribution zone 60 is set to have a curved area in which each of the constant relative speed lines g, h, i is curved in conformity with the curvature of the curved road 5.

Further, within this speed distribution zone 60, in a region around the preceding vehicle 3 inside the constant relative speed line g on which the allowable upper limit $V_{lim}$ is 0 km/h, an entry prohibition zone 62 is set in the same manner as that in the first embodiment, and, in a region outside the entry prohibition zone 62 and inside the constant relative speed line g on which the allowable upper limit $V_{lim}$ is 0 km/h, a relative speed-zero zone 64 is set in which the allowable upper limit $V_{lim}$ of relative speed between the vehicle 1 and the preceding vehicle 3 is restricted to 0 km/h. Thus, the relative speed-zero zone 64 is also set to have, in one of the lateral regions thereof, a curved area in which the constant relative speed line g is curved in conformity with the curvature of the curved road 5.

In the vehicle control system according to the second embodiment, when the vehicle 1 is located at a position offset laterally with respect to the forward-rearward direction of the stopped vehicle, the ECU 10 is operable, based on the speed distribution zone 60 set around the stopped vehicle 6, to calculate a travelable course for the vehicle 1 and a setup vehicle speed or target speed at each position on the course (e.g., a course R5 in FIG. 7), and execute traveling control so as to enable the vehicle 1 to travel along the calculated course, as with the first embodiment.

The above vehicle control system according to the second embodiment can bring out the following advantageous effects, When the vehicle 1 is located offset laterally with respect to the forward-rearward direction of the stopped vehicle 6, the ECU 10 operates to set the speed distribution zone 60 to have, only in a region of the speed distribution zone 60 located laterally beside the stopped vehicle 6, i.e., one of the lateral regions of the speed distribution zone 60 which is closer to the vehicle 1, a curved area in which each of the constant relative speed lines g, h, i is curved, and set the speed distribution zone 60 such that, in the other lateral region which is farther from the vehicle 1, each of the constant relative speed lines g, h, i has a straight side. Here, when the vehicle 1 is located offset laterally with respect to the stopped vehicle 6, specifically, when the vehicle 1 is located offset rightwardly with respect to the stopped vehicle 6 as in the second embodiment, a provability that the vehicle 1 approaches the right side of the stopped vehicle 6 is higher than a provability that the vehicle approaches the left side of the stopped vehicle 6. Therefore, in the second embodiment, in such a situation, the speed distribution zone 60 is set to have, only in a lateral region of the stopped vehicle 6 which is closer to the right side of the vehicle 1, a curved area in which each of the constant relative speed lines g, h, i is curved in conformity with the curvature of the road, so that it is possible to perform the setting of the speed distribution zone 60 in conformity to the shape of the road, only in a region having a higher provability that vehicle 1 actually approach, and simplify calculation processing for setting the speed distribution zone 60. This makes it possible to realize secure and safe driving support by simple calculation processing.

Third Embodiment

Next, a vehicle control system according to a third embodiment of the present invention will be described. The vehicle control system according to the third embodiment is different from the vehicle control system according to the first embodiment, in terms of setting of the speed distribution zone to be set around a preceding vehicle which is located on a curved road. Except for this difference, the vehicle control system according to the third embodiment has the same configuration as that of the vehicle control system according to the first embodiment.

Figure 8:
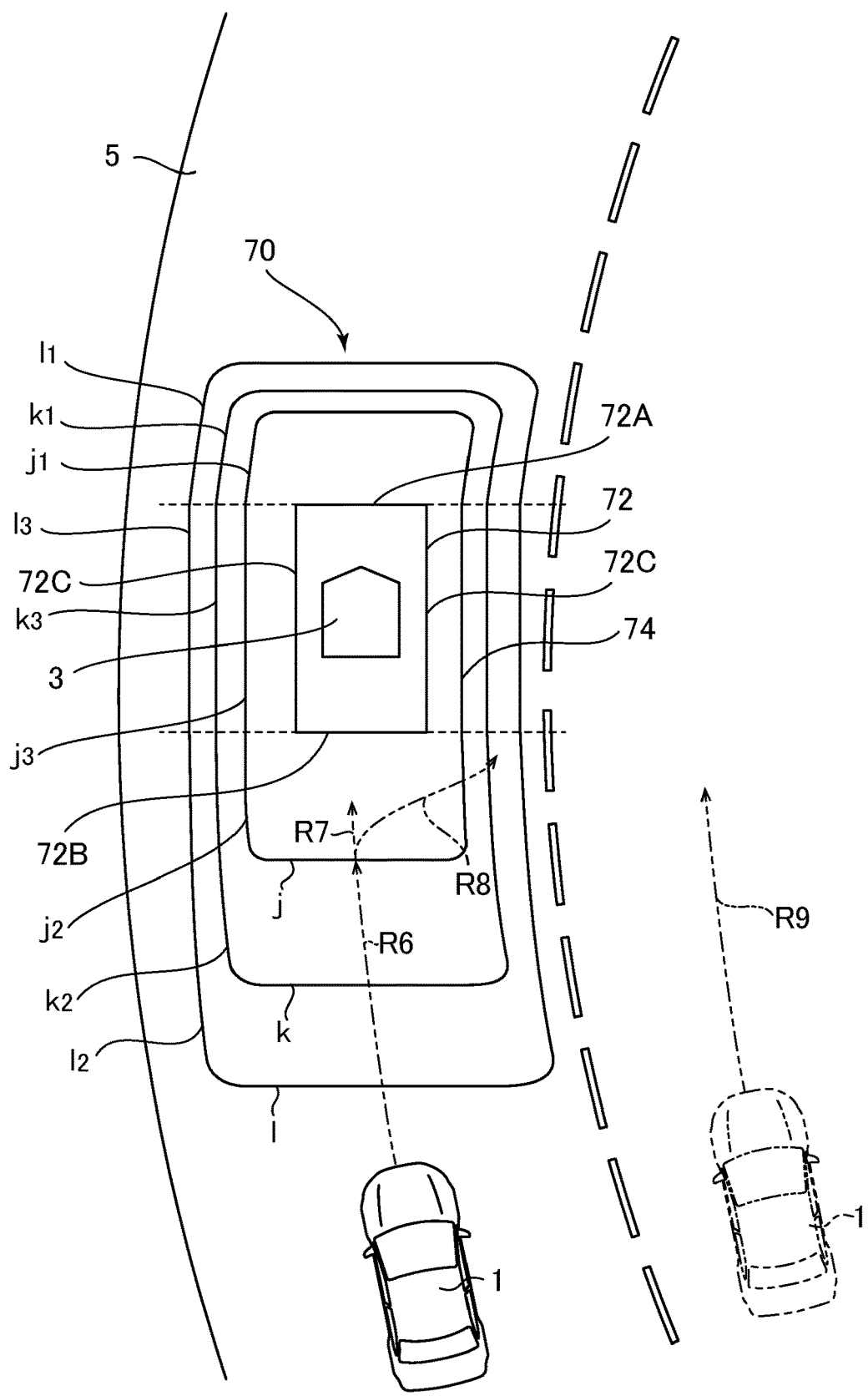
FIG. 8 is a diagram depicting a speed distribution zone which is set when the road is curved, in a vehicle control system according to a third embodiment of the present invention.

FIG. 8 is an explanatory diagram of a speed distribution zone 70 which is set to a preceding vehicle 3 by the vehicle control system according to the third embodiment, when the vehicle 1 and the preceding vehicle 3 are located on a curved road 5 during normal traveling. As depicted in FIG. 8, as with the speed distribution zone 40 to be set during traveling on the straight road 2, in the speed distribution zone 70, the allowable upper limit of the relative speed is set such that it becomes smaller as the lateral distance and the longitudinal distance from the preceding vehicle 3 become smaller (as the vehicle 1 approaches the preceding vehicle 3 more closely). In FIG. 8, for the sake of facilitating understanding, three constant relative speed lines each connecting the same value of the allowable upper limits are depicted. In this embodiment, the constant relative speed lines j, k, l correspond, respectively, to three lines on which the allowable upper limit $V_{lim}$ is 0 km/h, 20 km/h, and 40 km/h.

Within this speed distribution zone 70, in a region around the preceding vehicle 3 inside the constant relative speed line j on which the allowable upper limit $V_{lim}$ is 0 km/h, an entry prohibition zone 72 is set in which entry of the vehicle 1 thereinto is prohibited, i.e., across which the vehicle 1 cannot approach the preceding vehicle 3. The entry prohibition zone 72 is an approximately rectangular zone set in the same manner as that for the entry prohibition zone 42 to be set when the preceding vehicle 3 is located on the straight road 2.

Further, a front side and a rear side of each of the constant relative speed lines j on which the allowable upper limit $V_{lim}$ is 0 km/h, and the constant relative speed lines k, l are disposed parallel to the lateral direction of the preceding vehicle 3, in the same manner as that for the front side and the rear side of each of the constant relative speed lines a, b, c to be set during traveling on the straight road 2. Further, length dimensions of the front and rear sides of each of the constant relative speed lines j, k, l are set in the same manner as that for length dimensions of the front and rear sides of of each of the constant relative speed lines a, b, c, and the front and rear edges of each of the constant relative speed lines j, k, l are disposed at positions symmetric with respect to the preceding vehicle 3. On the other hand, in each of opposite lateral regions of the speed distribution zone 70, a lateral side of each of the constant relative speed lines j, k, l has a front section ($j_1$, $k_1$, $l_1$) located forward of a front boundary line 72A of the entry prohibition zone 72, and a rear section ($j_2$, $k_2$, $l_2$) located rearward of a rear boundary line 72B of the entry prohibition zone 72, wherein each of the front section ($j_1$, $k_1$, $l_1$) and the rear section ($j_2$, $k_2$, $l_2$) is curved with a curvature corresponding to a curvature of the curved road 5, more specifically with a curvature equal to the curvature of the curved road 5. Thus, in each of the lateral regions of the speed distribution zone 70, a curved area is set in which a part of each of the constant relative speed lines j, k, l located forward and rearward of the entry prohibition zone 72 is curved in conformity with a curvature of the curved road 5. Further, in each of the opposite lateral regions of the speed distribution zone 70, the lateral side of each of the constant relative speed lines j, k, l has an intermediate section ($j_3$, $k_3$, $l_3$) located rearward of the front boundary line 72A and forward of the rear boundary line 72B of the entry prohibition zone 72, wherein intermediate section ($j_3$, $k_3$, $l_3$) is disposed to extend along a lateral boundary line 72C, more specifically extend linearly and parallel to the lateral boundary line 72C. Further, four corners of each of the constant relative speed lines j, k, l are formed in an arc shape in the same manner as that for the speed distribution zone 40 to be set when the preceding vehicle 3 is located on the straight road 2.

Here, in a region outside the entry prohibition zone 72 and inside the constant relative speed line j on which the allowable upper limit $V_{lim}$ is 0 km/h, a relative speed-zero zone 74 is set in which the allowable upper limit $V_{lim}$ of relative speed between the vehicle 1 and the preceding vehicle 3 is restricted to 0 km/h. Thus, in each of opposite lateral regions of the relative speed-zero zone 74, the curved area is set forward and rearward of the entry prohibition zone 72.

The entry prohibition zone 72 is more enlarged as the traveling speed Vp of the preceding vehicle 3 becomes higher. In this case, a forward-rearward directional length or lateral position of each of the constant relative speed lines $j_3$, $k_3$, $l_3$ is changed along with an enlargement of the entry prohibition zone 72.

In the above vehicle control system 100, the ECU 10 (speed distribution zone setting part) operates to set one of the speed distribution zones 40, 70 with respect to the detected object (i.e., the preceding vehicle 3), according to a calculated curvature of the road. Here, when the road is straight, the curvature of the road is 0. Thus, the approximately rectangular speed distribution zone 40 as depicted in FIG. 3 is set in which the curvature of each of the lateral sides of the constant relative speed lines a, b, c is 0. On the other hand, when the road is curved, the curvature of the road has a value other than 0. Thus, the speed distribution zone 70 is set to have a curved area in which the front and rear sections ($j_1$, $k_1$, $l_1$, $j_2$, $k_2$, $l_2$) of each of the lateral sides of the constant relative speed lines j, k, l located forward and rearward of the entry prohibition zone 72 are curved, as depicted in FIG. 8. That is, in each case, in each of the lateral sides of the constant relative speed lines in the speed distribution zone (40, 70), a part of the lateral side located forward and rearward of the entry prohibition zone (52, 72) is disposed to extend in conformity with the curvature of the road, and the remaining part of the lateral side laterally beside the entry prohibition zone (52C, 72C) is disposed parallel to the lateral boundary line (52C, 72C) of the entry prohibition zone (52, 72).

Then, as with the first embodiment, the ECU 10 operates to set, e.g., a course to be used when the vehicle 1 approaches from behind the preceding vehicle 3, as indicated by a course R6 in FIG. 8, a course to be used when the vehicle 1 is controlled such that it travels outside (rearward of) the rear boundary line 52B of the entry prohibition zone 52 without moving beyond the rear boundary line 52B, as indicated by a course R7 in FIG. 8, and a course to be used when the vehicle 1 is subjected to speed control and steering control so as to avoid collision with the preceding vehicle 3, as indicated by a course R8 in FIG. 8, and execute traveling control.

Further, the speed distribution zone 70 set around the preceding vehicle 3 does not protrude from a lane on which the preceding vehicle 3 is located. Thus, even in a situation when the vehicle 1 is traveling on a lane next to, e.g., on the right side of the lane of the preceding vehicle 3, as indicated by the two-dot chain line in FIG. 8, the vehicle 1 can travel on the neighboring lane without being restricted by the allowable upper limit $V_{lim}$ of the speed distribution zone 70 (e.g., course R9).

The above vehicle control system according to the third embodiment can bring out the following advantageous effects, When the preceding vehicle 3 is located on the curved road 5, the ECU 10 operates to set the speed distribution zone 70 to have, in a region thereof laterally beside the preceding vehicle 3, a curved area in which a part of each of the constant relative speed lines j, k, l located forward and rearward of the entry prohibition zone 72 is curved in conformity with the curvature of the curved road 5, so that it is possible to prevent the speed distribution zone 70 from protruding from a lane of the road on which the preceding vehicle 3 is located.

Further, when the preceding vehicle 3 is located on a curved road 3, the ECU 10 operated to set the speed distribution zone 70 such that, in the region thereof laterally beside the preceding vehicle 3, a part of each of the constant relative speed lines j, k, l located laterally beside the entry prohibition zone 72 is disposed to extend linearly and parallel to the lateral boundary line 72C of the entry prohibition zone 72, so that it is possible to keep a given distance between each of the constant relative speed lines j, k, l and the lateral boundary line 72C of the entry prohibition zone 72.

Here, a problem conceivable when the preceding vehicle 3 is located on a curved road will be described. For example, as shown in the first embodiment, when each of the constant relative speed lines d, e, f is curved in conformity with the curvature of the road in the lateral regions of the speed distribution zone 50, one or more of the constant relative speed lines d, e, f can overlap the entry prohibition zone 52, depending on the position of the preceding vehicle 3 on the road, the curvature of the curved road, etc. Thus, it becomes impossible to set the constant relative speed lines d, e, f. Further, when each of the constant relative speed lines d, e, f is curved in conformity with the curvature of the road, a distance among the constant relative speed lines d, e, f is likely to become significantly small in a region laterally beside the entry prohibition zone 52. In such a situation, if the vehicle 1 approaches the preceding vehicle 1 from laterally beside the preceding vehicle, it is conceivable that the vehicle 1 is obliged to undergo rapid deceleration or course change.

In this embodiment, in such a situation, in a region laterally beside the preceding vehicle 3, i.e., the lateral regions of the speed distribution zone 70, the speed distribution zone 70 is set to have a curved area in which a part ($j_1$, $k_1$, $l_1$, $j_2$, $k_2$, $l_2$) of each of the constant relative speed lines j, k, l located forward and rearward of the entry prohibition zone 72 is curved in conformity with a curvature equal to the curvature of the curved road 5, so that it is possible to set the speed distribution zone 70 inconformity with the shape of the road so as to prevent the speed distribution zone 70 from protruding into a neighboring lane.

Further, in the lateral regions of the speed distribution zone 70, the intermediate section (j3, k3, l3) of each of the constant relative speed lines j, k, l is set to extend parallel to the lateral boundary line 72C of the entry prohibition zone 72, so that it is possible to prevent the intermediate section (j3, k3, l3) of each of the constant relative speed lines j, k, l from coming excessively close to the entry prohibition zone 72 so as to ensure a given distance between the entry prohibition zone 72 and each of the constant relative speed lines j, k, l.

As above, each of the constant relative speed lines j, k, l is set to extend parallel to the entry prohibition zone 72, in a region of the speed distribution zone 70 located laterally beside the entry prohibition zone 72, and to have a curved area with a curvature equal to the curvature of the road, in a region of the speed distribution zone 70 located forward and rearward of the entry prohibition zone 72, so that it is possible to, e.g., avoid unnecessary deceleration and/or steering of the vehicle 1 which is traveling on a neighbor lane, and avoid rapid deceleration and/or steering when the vehicle 1 catches up with the preceding vehicle 3 from laterally beside the preceding vehicle 3. Therefore, the vehicle control system 100 according to the third embodiment can provide driving support capable of enabling a passenger to feel secure and safe.

Fourth Embodiment

Next, a vehicle control system according to a fourth embodiment of the present invention will be described. The vehicle control system according to the fourth embodiment is different from the vehicle control system according to the third embodiment, in terms of setting of the speed distribution zone to be set around a stopped vehicle 6 as the object. Except for this difference, the vehicle control system according to the fourth embodiment has the same configuration as that of the vehicle control system according to the third embodiment.

Figure 9:
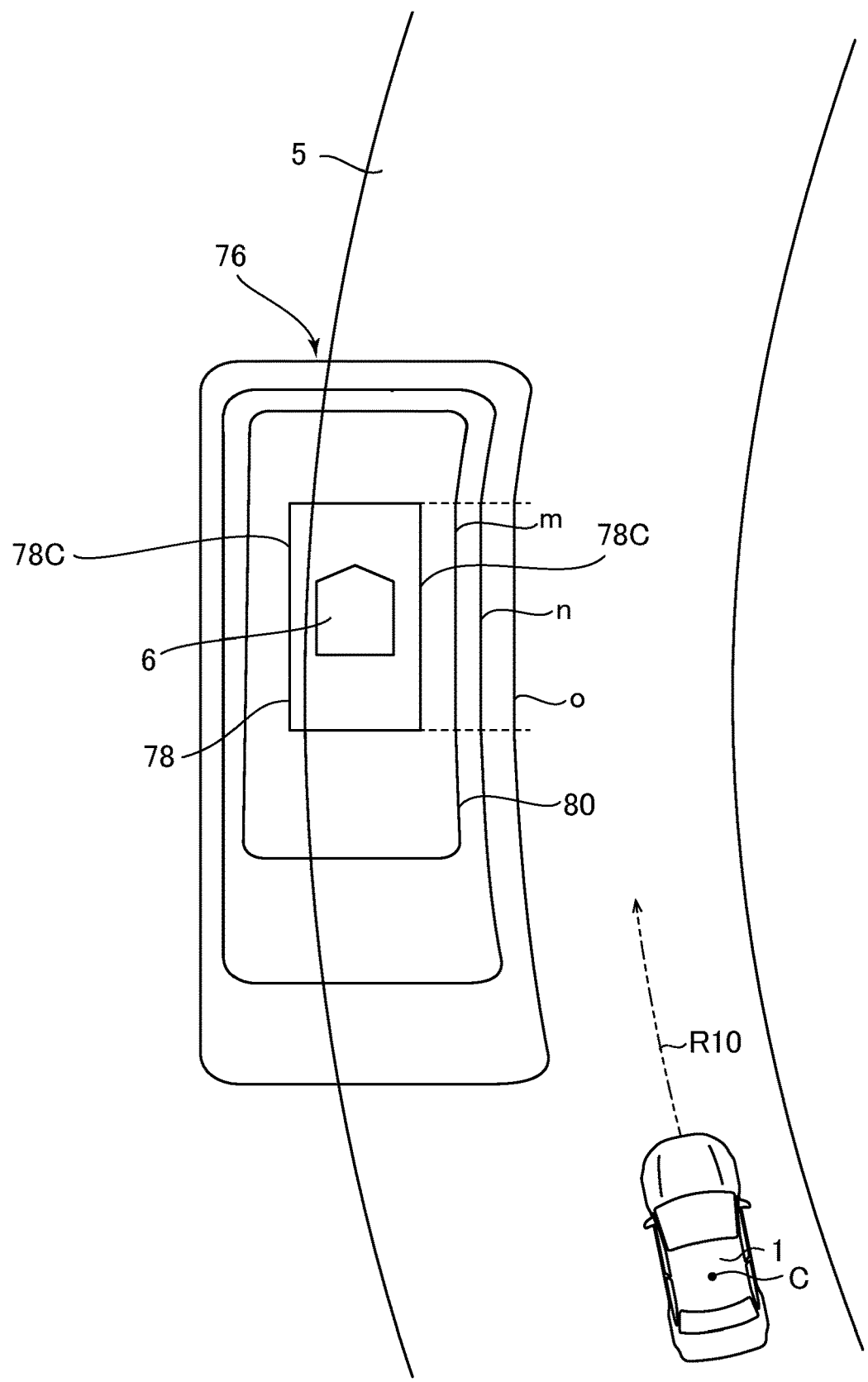
FIG. 9 is a diagram depicting a speed distribution zone which is set to a stopped vehicle, in a vehicle control system according to a fourth embodiment of the present invention.

FIG. 9 is a diagram of a speed distribution zone 76 which is set to a stopped vehicle 6 by the vehicle control system according to the fourth embodiment. In this embodiment, the stopped vehicle 6 is stopped at an end (left end) on the curved road 5. Thus, the vehicle 1 which is traveling on the road 5 is located offset laterally with respect to the traveling direction (forward-rearward direction) of the stopped vehicle 6. When the vehicle 1 is located offset laterally with respect to the forward-rearward direction of the stopped vehicle 6, the ECU is operable to set a speed distribution zone 76 to have opposite lateral regions laterally beside the stopped vehicle 6, wherein, in only one of the lateral regions which is closer to the vehicle 1, a constant relative speed line is set to extend along an entry prohibition zone 78 in a region laterally beside an entry prohibition zone 78, and to be curved in conformity with a curvature of the road in a region forward and rearward of the entry prohibition zone 78.

Here, the ECU 10 is operable, when one (left end, in the example depicted in FIG. 9) of opposite lateral ends of the vehicle 1 is located at a position of one (right end, in the example depicted in FIG. 9) of opposite lateral ends of the stopped vehicle 6, or at a position further laterally (rightwardly, in the example depicted in FIG. 9) away from the stopped vehicle 6, to determine that the vehicle 1 is located offset with respect to the stopped vehicle 6. Alternatively, the ECU 10 may be configured to be operable, when the center C of the vehicle 1 is located at a position of the lateral end (right end, in the example depicted in FIG. 9) of the stopped vehicle 6, or at a position further laterally away from the stopped vehicle 6, to determine that the vehicle 1 is located offset with respect to the stopped vehicle 6.

As with the speed distribution zone 50 in the first embodiment, in the speed distribution zone 76, the allowable upper limit of the relative speed is set such that it becomes smaller as the lateral distance and the longitudinal distance from the stopped vehicle 6 become smaller (as the vehicle 1 approaches the stopped vehicle 6 more closely). In FIG. 9, for the sake of facilitating understanding, three constant relative speed lines each connecting the same value of the allowable upper limits are depicted. In this embodiment, the constant relative speed lines m, n, o correspond, respectively, to three lines on which the allowable upper limit $V_{lim}$ is 0 km/h, 20 km/h, and 40 km/h.

Within this speed distribution zone 76, in a region around the preceding vehicle 3 inside the constant relative speed line m on which the allowable upper limit $V_{lim}$ is 0 km/h, an entry prohibition zone 52 is set in the same manner as that in the first embodiment, and, in a region outside the entry prohibition zone 52 and inside the constant relative speed line m on which the allowable upper limit $V_{lim}$ is 0 km/h, a relative speed-zero zone 80 is set in which the allowable upper limit $V_{lim}$ of relative speed between the vehicle 1 and the preceding vehicle 3 is restricted to 0 km/h.

Here, front, rear and left sides of each of the constant relative speed lines m, m, o are arranged in the same manner as that for the front, rear and left sides of each of the constant relative speed lines a, b, c of the speed distribution zone 40 in the first embodiment. On the other hand, in one of the lateral sides of each of the constant relative speed lines m, n, o to which the vehicle 2 is located closer, i.e., the right side of each of the constant relative speed lines m, n, o, a part of the right side located forward and rearward of the entry prohibition zone 78 is formed as a curved area which is curved with a curvature corresponding to the curvature of the curved road 5, more specifically with a curvature equal to the curvature of the curved road 5, as with the speed distribution zone 70 in the third embodiment.

In the vehicle control system according to the second embodiment, when the vehicle 1 is located at a position offset laterally with respect to the forward-rearward direction of the stopped vehicle, the ECU 10 is operable, based on the speed distribution zone 73 set around the stopped vehicle 6, to calculate a travelable course for the vehicle 1 and a setup vehicle speed or target speed at each position on the course (e.g., a course R10 in FIG. 9), and execute traveling control so as to enable the vehicle 1 to travel along the calculated course, as with the first embodiment.

The above vehicle control system according to the fourth embodiment can bring out the following advantageous effects.

When the vehicle 1 is located offset laterally with respect to the forward-rearward direction of the stopped vehicle 6, the ECU 10 operates to set the speed distribution zone 76 such that, only in a region of the speed distribution zone 76 located laterally beside the stopped vehicle 6, i.e., one of the lateral regions of the speed distribution zone 76 which is closer to the vehicle 1, a part of each of the constant relative speed lines m, n, o located forward and rearward of the entry prohibition zone 78 is curved, and a part of each of the constant relative speed lines m, n, o located laterally beside the entry prohibition zone 78 is disposed to extend parallel to a lateral boundary line 78C of the entry prohibition zone 78. Further, the speed distribution zone 76 is set such that, in the other lateral region which is farther from the vehicle 1, each of the constant relative speed lines m, n, o has a straight side. Here, when the vehicle 1 is located offset laterally with respect to the stopped vehicle 6, specifically, when the vehicle 1 is located offset rightwardly with respect to the stopped vehicle 6 as in the fourth embodiment, a provability that the vehicle 1 approaches the right side of the stopped vehicle 6 is higher than a provability that the vehicle approaches the left side of the stopped vehicle 6. Therefore, in the fourth embodiment, in such a situation, the speed distribution zone 76 is set to have, only in a lateral region of the stopped vehicle 6 which is closer to the right side of the vehicle 1, a curved area in which a part of each of the constant relative speed lines m, n, o located forward and rearward of the entry prohibition zone 78 is curved in conformity with the curvature of the road, so that it is possible to perform the setting of the speed distribution zone 76 in conformity to the shape of the road, only in a region having a higher provability that vehicle 1 actually approach, and simplify calculation processing for setting the speed distribution zone 60. This makes it possible to realize secure and safe driving support by simple calculation processing of the speed distribution zone 76.

Fifth Embodiment

Next, a vehicle control system according to a fifth embodiment of the present invention will be described. The vehicle control system according to the fifth embodiment is different from the vehicle control system according to the first embodiment, in terms of setting of the speed distribution zone to be set when the vehicle 1 overtakes a preceding vehicle 3. Except for this difference, the vehicle control system according to the fifth embodiment has the same configuration as that of the vehicle control system according to the first embodiment.

Figure 10:
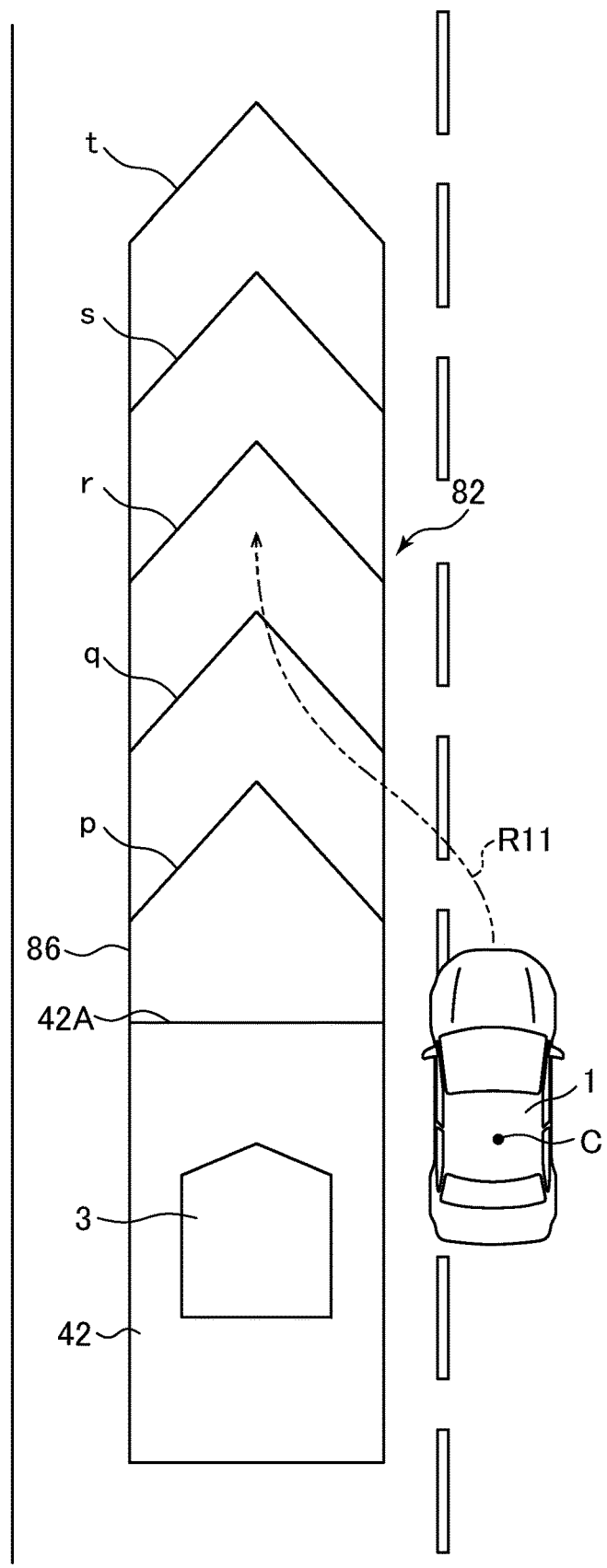
FIG. 10 is a diagram depicting a speed distribution zone which is set when the road is straight, in a vehicle control system according to a fifth embodiment of the present invention.

FIG. 10 is a diagram depicting a speed distribution zone 82 which is set to the preceding vehicle 3 which is traveling on a straight road, in the vehicle control system according to the fifth embodiment.

Figure 11:
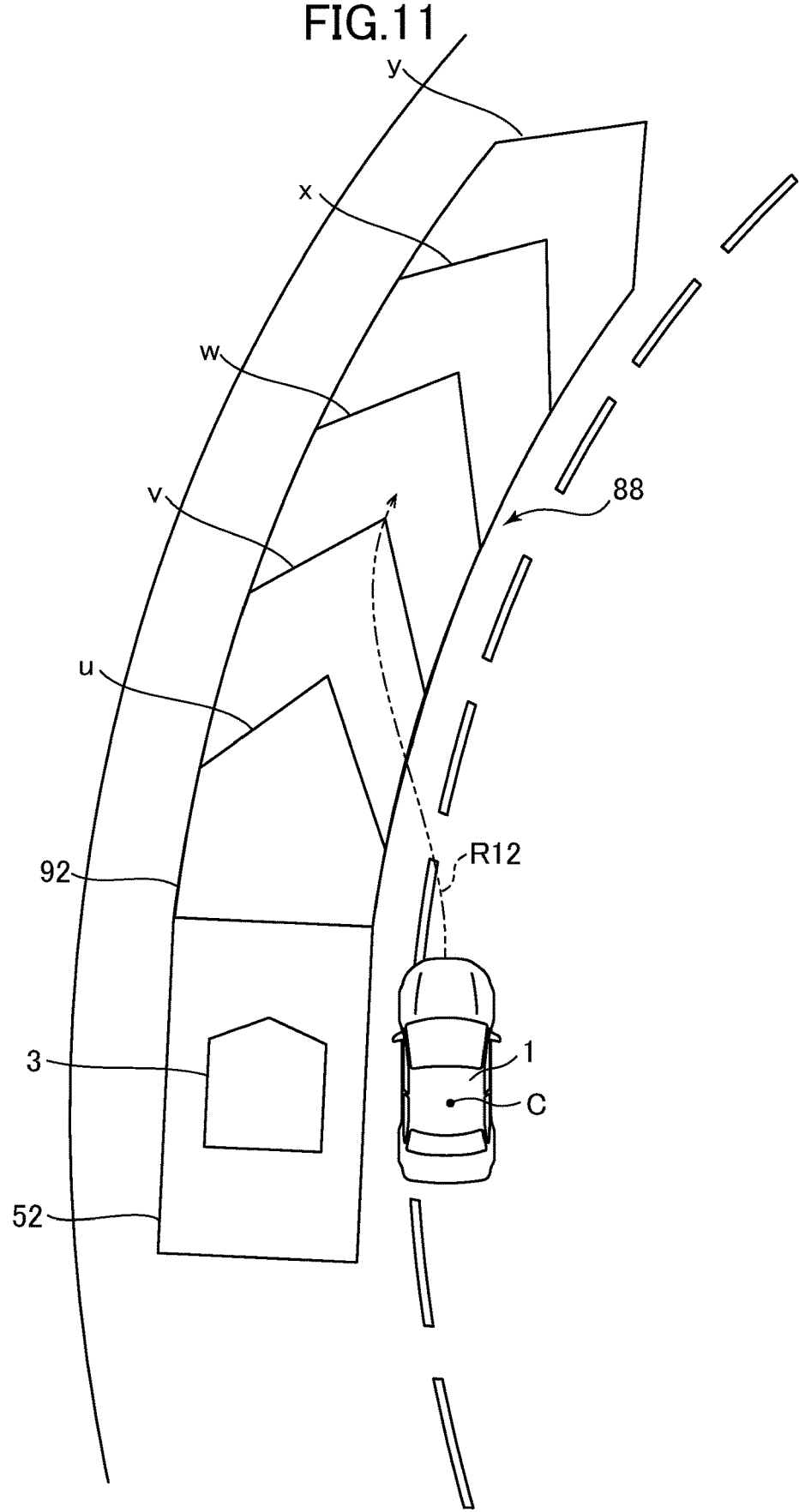
FIG. 11 is a diagram depicting a speed distribution zone which is set when the road is curved, in the vehicle control system according to the fifth embodiment.

FIG. 11 is a diagram depicting a speed distribution zone 88 which is set to the preceding vehicle 3 which is traveling on a curved road, in the vehicle control system according to the fifth embodiment. Thus, each of the speed distribution zones 82, 88 includes an overtaking speed distribution zone (86, 92) to be set when the vehicle 1 overtakes the preceding vehicle 3, in addition to the same entry prohibition zone (42, 52) as that in the first embodiment.

First of all, as depicted in FIG. 10, when a road is straight, the speed distribution zone 82 is set to extend linearly along an extending direction of the road. The overtaking speed distribution zone 86 of the speed distribution zone 82 is set ahead of the vehicle 1, more specifically, ahead of the entry prohibition zone 42, and defines a distribution zone of an allowable lower limit $V_{min}$ of the relative speed of the vehicle 1 with respect to the preceding vehicle 3 in the traveling direction of the vehicle 1. The overtaking speed distribution zone 86 is set to extend forwardly from the front boundary line 42A of the entry prohibition zone 42 with the same width as that of the entry prohibition zone 42, and set such that the allowable lower limit $V_{min}$ becomes larger as a distance from the preceding vehicle 3 in the forward-rearward (longitudinal) direction becomes smaller. In FIG. 10, for the sake of facilitating understanding, five constant relative speed lines p, q, r, s, t connecting the same value of the allowable lower limit $V_{min}$ are depicted. Each of the constant relative speed lines p, q, r, s, t c extends obliquely forwardly toward a widthwise middle thereof. In this embodiment, the constant relative speed lines p, q, r, s, t correspond, respectively, to five lines on which the allowable lower limit $V_{min}$ is 50 km/h, 40 km/h, 30 km/h, 20 km/h and 10 km/h.

On the other hand, as depicted in FIG. 11, when the road is curved, the speed distribution zone 88 is set to be curved along the extending direction of the road. The overtaking speed distribution zone 92 is set ahead of the vehicle 1, more specifically ahead of the entry prohibition zone 52, in the same manner as that for the overtaking speed distribution zone 86 of the speed distribution zone 82 to be set during traveling on the straight road, and set such that the allowable lower limit $V_{min}$ becomes larger as a distance from the preceding vehicle 3 in the forward-rearward (longitudinal) direction becomes smaller. In FIG. 11, for the sake of facilitating understanding, five constant relative speed lines u, v, w, x, y connecting the same value of the allowable lower limit $V_{min}$ are depicted. Each of opposite lateral sides of the constant relative speed lines u, v, w, x, y extends along the extending direction of the road, more specifically, is curved with a curvature equal to a curvature of the road. Thus, each of opposite lateral sides of the overtaking speed distribution zone 92 of the speed distribution zone 88 is set to have a curved area in which each of the constant relative speed lines u, v, w, x, y is curved in conformity to the curvature of the curved road 5. Further, each of the constant relative speed lines u, v, w, x, y extends obliquely forwardly toward a widthwise middle thereof. In this embodiment, the constant relative speed lines u, v, w, x, y correspond, respectively, to five lines on which the allowable lower limit $V_{min}$ is 50 km/h, 40 km/h, 30 km/h, 20 km/h and 10 km/h.

The vehicle control system 100 according to the fifth embodiment is operable, when the vehicle 1 is located behind the preceding vehicle 3, to set the speed distribution zone (40, 50) around the preceding vehicle 3 in the same manner as that in the first embodiment. Then, when the vehicle 1 passes or overtakes the preceding vehicle 3, the vehicle control system 100 is operable, based on the speed distribution zone (40, 50) to calculate a course along which the vehicle 1 can travel, and a setup vehicle speed or target speed at each point on the course. Then, the ECU 10 is operable to execute traveling control to enable the vehicle 1 to travel along the calculated course.

When the vehicle 1 moves ahead of the preceding vehicle 3 after passing laterally beside the preceding vehicle 3, the vehicle control system 100 is operable to switch the speed distribution zone to be set to the preceding vehicle 3 from the speed distribution zone (40, 50) to the speed distribution zone (82, 88). In the this embodiment, the center C of the vehicle 1 is recognized as the positon of the vehicle 1. Thus, when the center C of the vehicle 1 is moved beyond the front end of the preceding vehicle 3 in the traveling direction of the vehicle 1 and located ahead of the preceding vehicle 3, the vehicle 1 is determined to have moved ahead of the preceding vehicle 3. Alternatively, the ECU 10 may be configured to be operable, when the front edge of the vehicle 1 reaches the front end of the preceding vehicle 1, to determine that the vehicle 1 has moved ahead of the preceding vehicle 3, or to be operable, when the read edge of the vehicle 1 reaches the front end of the preceding vehicle 1, to determine that the vehicle 1 has moved ahead of the preceding vehicle 3.

Here, when the road is straight, the curvature of the road is 0. Thus, as a result of setting of the speed distribution zone 82 by the ECU 10, the speed distribution zone 82 as depicted in FIG. 10 is set in which the curvature of the lateral side of each of the constant relative speed lines u, v, w, x, y is 0. On the other hand, when the road is curved, the curvature of the road has a value other than 0. Thus, the speed distribution zone 88 as depicted in FIG. 11 is set in which the lateral side of each of the constant relative speed lines u, v, w, x, y has a curved area with a curvature equal to the curvature of the road. That is, in each case, each of the lateral sides of the constant relative speed lines in the speed distribution zone is disposed with a curvature equal to the curvature of the road.

When the vehicle 1 performs overtaking, in the vehicle control system 100, the ECU 10 is operable, based on the overtaking speed distribution zone (82, 88), to calculate a course (e.g. course R11 in FIG. 10, or course R12 in FIG. 11) along which the vehicle 1 can travel when moving ahead of the preceding vehicle 3 and a setup vehicle speed or target speed at each point on this course, such that the traveling speed of the vehicle 1 is prevented from falling below the allowable lower limit $V_{min}$ set in the overtaking speed distribution zone (82, 88).

The vehicle control system according to the fifth embodiment 100 can bring out the following advantageous effects.

When the vehicle 1 overtakes the preceding vehicle 3 and moves ahead of the preceding vehicle 3, the overtaking speed distribution zone (82, 88) is set ahead of the preceding vehicle 52, so that, in a situation where the vehicle 1 moves from a position laterally beside the preceding vehicle 3 to a position ahead of the preceding vehicle 3, and enters ahead of the preceding vehicle 3, the relative speed of the vehicle 1 with respect to the preceding vehicle 3 is controlled in accordance with the allowable lower limit set in the overtaking speed distribution zone (82, 88). Therefore, when the vehicle 1 overtakes the preceding vehicle 3, the traveling speed and the inter-vehicle distance allowing a drive to feel safe with respect to the preceding vehicle 3 is also ensured, so that it is possible to realize driving support enabling the driver to feel safe.

Further, when the road is curved, the curved area which is curved with a curvature equal to the curvature of the road is set in the overtaking speed distribution zone 92, so that it is possible to set the speed distribution zone 88 along the curved road to thereby adequately perform traveling control of the vehicle 1.

It is to be understood that the present invention is not limited to the above embodiments, but various modifications and changes may be made therein, e.g., as follows.

The speed distribution zone is not limited to a zone set all around a preceding vehicle. For example, the speed distribution zone may be set only in a region ahead of the preceding vehicle, as in the fifth embodiment, or only in a region laterally beside or behind the preceding vehicle. In short, the speed distribution zone may be set in at least a part of a region around an object.

In the first and third embodiments, each of the constant relative speed lines of the speed distribution zone is set to be curved in both the opposite regions laterally beside the proceeding vehicle 3, and, in the second and fourth embodiments, each of the constant relative speed lines of the speed distribution zone is set to be curved in one of the opposite regions laterally beside the stopped vehicle 3. In short, when an object is located on a curved road, each of the constant relative speed lines of the speed distribution zone may be set to be curved in at least one of the opposite regions laterally beside the object.

Further, the curved constant relative speed line is not limited to a line set in an arc shape with a curvature equal to the curvature of the road as in the above embodiments, but may be a line which is generally curved in conformity with the curvature of the road, such as a curve or a continuous straight lines derived by a given calculation based on the curvature of the road.

In the second and fourth embodiments, the speed distribution zone (60, 76) set such that each of the constant relative speed lines is curved only in one of the lateral regions is set to the stopped vehicle 6. Alternatively, this technique can also be applied to cases using other objects such as a traveling vehicle. In this case, when the vehicle is located offset laterally with respect to the forward-rearward direction of such an object, each of the constant relative speed lines may be curved in conformity with the curvature of the road, only in one of the lateral regions of the speed distribution zone which is closer to the vehicle.

LIST OF REFERENCE SIGNS

1: vehicle
2: straight road
3: preceding vehicle (object)
5: curved road
6: stopped vehicle (object)
21: vehicle-mounted camera
22: millimeter-wave radar
23: vehicle speed sensor
24: position measurement system
24: navigation system
31: engine control system
32: brake control system
33: steering control system
40, 50, 60, 70, 76, 82, 88: speed distribution zone
42, 52, 62, 72, 78: entry prohibition zone
44, 54, 64, 74, 80; relative speed-zero zone
100: vehicle control system
a to s: constant relative speed line
$D_0$: safe distance
X: clearance
R1 to R12: course

The invention claimed is:

1. A vehicle control system which is mounted on a vehicle, the vehicle control system comprising a processor configured to:

detect an object ahead of the vehicle, and set, in a region around the object, a speed distribution zone defining a distribution of an allowable upper limit of a relative speed of the vehicle with respect to the object in a traveling direction of the vehicle; and execute traveling control of preventing the relative speed from exceeding the allowable upper limit when the vehicle is located within the speed distribution zone, wherein the speed distribution zone is set such that the allowable upper limit of the relative speed is set to be smaller as a distance from the object becomes smaller, such that, when the object is located on a straight road, a plurality of constant relative speed lines each connecting points having a same value of the allowable upper limit extends linearly at lateral regions of the speed distribution zone, and such that, when the object is located on a curved road, the speed distribution zone is set to have a curved area in which all of a plurality of constant relative speed lines are curved in conformity with a curvature of the road in a similar manner in at least one of lateral regions of the speed distribution zone.

2. The vehicle control system as recited in claim 1, wherein the speed distribution zone includes:
a relative speed-zero zone at a position away from the object by a given distance where the allowable upper limit becomes zero; and
an entry prohibition zone at a position closer to the object than the relative speed-zero zone where entry of the vehicle thereinto is prohibited.

3. The vehicle control system as recited in claim 1, wherein the speed distribution zone includes an entry prohibition zone where entry of the vehicle thereinto is prohibited at a position away from the object by a given distance, and wherein, when the object is located on a curved road, in the lateral regions of the speed distribution zone, the constant relative speed line is set to extend along the entry prohibition zone beside the entry prohibition zone, and wherein the curved area is set forward and rearward of the entry prohibition zone.

4. The vehicle control system as recited in claim 3, wherein the entry prohibition zone is set such that it is more enlarged as a movement speed of the object becomes higher.

5. The vehicle control system as recited in claim 3, wherein, when the vehicle is located at a position offset laterally with respect to a forward-rearward direction of the object, the speed distribution zone is set such that the constant relative speed line is set to extend along the entry prohibition zone beside the entry prohibition zone, and wherein the curved area is set forward and rearward of the entry prohibition zone only in one of the lateral regions of the speed distribution zone which is closer to the vehicle.

6. The vehicle control system as recited in claim 2, wherein the speed distribution zone includes an entry prohibition zone where entry of the vehicle thereinto is prohibited at a position away from the object by a given distance, and wherein, when the object is located on a curved road, in the lateral regions of the speed distribution zone, the constant relative speed line is set to extend along the entry prohibition zone beside the entry prohibition zone, and wherein the curved area is set forward and rearward of the entry prohibition zone.

7. The vehicle control system as recited in claim 6, wherein the entry prohibition zone is set in an approximately rectangular shape, and wherein, when the object is located on a curved road, in the lateral regions of the speed distribution zone, the constant relative speed line is set to extend linearly and parallel to a lateral boundary line of the entry prohibition zone beside the entry prohibition zone, and wherein the curved area is set forward and rearward of the entry prohibition zone.

8. The vehicle control system as recited in claim 4, wherein, when the vehicle is located at a position offset laterally with respect to a forward-rearward direction of the object, the speed distribution zone is set such that the constant relative speed line is set to extend along the entry prohibition zone beside the entry prohibition zone, and wherein the curved area is set forward and rearward of the entry prohibition zone only in one of the lateral regions of the speed distribution zone which is closer to the vehicle.

9. A vehicle control system which is mounted on a vehicle, the vehicle control system comprising a processor configured to:
detect an object ahead of the vehicle, and set, in a region around the object, a speed distribution zone defining a distribution of an allowable upper limit of a relative speed of the vehicle with respect to the object in a traveling direction of the vehicle; and execute traveling control of preventing the relative speed from exceeding the allowable upper limit when the vehicle is located within the speed distribution zone, wherein the speed distribution zone is set such that the allowable upper limit of the relative speed is set to be smaller as a distance from the object becomes smaller, such that, when the object is located on a straight road, a constant relative speed line connecting points having a same value of the allowable upper limit extends linearly at lateral regions of the speed distribution zone, and such that, when the object is located on a curved road, the speed distribution zone is set to have a curved area in which a constant relative speed line is curved in conformity with a curvature of the road in at least one of lateral regions of the speed distribution zone, and wherein, when the vehicle is located at a position offset laterally with respect to a forward-rearward direction of the object, the speed distribution zone is set to have the curved area only in one of the lateral regions which is closer to the vehicle.

10. The vehicle control system as recited in claim 9, wherein the speed distribution zone includes:
a relative speed-zero zone at a position away from the object by a given distance where the allowable upper limit becomes zero; and
an entry prohibition zone at a position closer to the object than the relative speed-zero zone where entry of the vehicle thereinto is prohibited.

11. The vehicle control system as recited in claim 9, wherein the speed distribution zone includes an entry prohibition zone where entry of the vehicle thereinto is prohibited at a position away from the object by a given distance, and wherein, when the object is located on a curved road, in the lateral regions of the speed distribution zone, the constant relative speed line is set to extend along the entry prohibition zone beside the entry prohibition zone, and wherein the curved area is set forward and rearward of the entry prohibition zone.

12. The vehicle control system as recited in claim 11, wherein the entry prohibition zone is set in an approximately rectangular shape, and wherein, when the object is located on a curved road, in the lateral regions of the speed distribution zone, the constant relative speed line is set to extend linearly and parallel to a lateral boundary line of the entry prohibition zone beside the entry prohibition zone, and wherein the curved area is set forward and rearward of the entry prohibition zone.

13. The vehicle control system as recited in claim 9, wherein the speed distribution zone includes:
   a relative speed-zero zone at a position away from the object by a given distance where the allowable upper limit becomes zero; and
   an entry prohibition zone at a position closer to the object than the relative speed-zero zone where entry of the vehicle thereinto is prohibited.

14. The vehicle control system as recited in claim 9, wherein the speed distribution zone includes an entry prohibition zone where entry of the vehicle thereinto is prohibited at a position away from the object by a given distance, and wherein, when the object is located on a curved road, in the lateral regions of the speed distribution zone, the constant relative speed line is set to extend along the entry prohibition zone beside the entry prohibition zone, and wherein the curved area is set forward and rearward of the entry prohibition zone.

15. The vehicle control system as recited in claim 13, wherein, when the vehicle is located at a position offset laterally with respect to a forward-rearward direction of the object, the speed distribution zone is set such that the constant relative speed line is set to extend along the entry prohibition zone beside the entry prohibition zone, and wherein the curved area is set forward and rearward of the entry prohibition zone only in one of the lateral regions of the speed distribution zone which is closer to the vehicle.

16. A vehicle control system which is mounted on a vehicle, the vehicle control system comprising a processor configured to:
   detect an object ahead of the vehicle, and set, in a region around the object, a speed distribution zone defining a distribution of an allowable upper limit of a relative speed of the vehicle with respect to the object in a traveling direction of the vehicle; and
   execute traveling control of preventing the relative speed from exceeding the allowable upper limit when the vehicle is located within the speed distribution zone,
   wherein the speed distribution zone is set such that the allowable upper limit of the relative speed is set to be smaller as a distance from the object becomes smaller, such that, when the object is located on a straight road, a constant relative speed line connecting points having a same value of the allowable upper limit extends linearly at lateral regions of the speed distribution zone, and such that, when the object is located on a curved road, the speed distribution zone is set to have a curved area in which a constant relative speed line is curved in conformity with a curvature of the road in at least one of lateral regions of the speed distribution zone,
   wherein the speed distribution zone includes an entry prohibition zone where entry of the vehicle thereinto is prohibited at a position away from the object by a given distance, and wherein, when the object is located on a curved road, in the lateral regions of the speed distribution zone, the constant relative speed line is set to extend along the entry prohibition zone beside the entry prohibition zone, and wherein the curved area is set forward and rearward of the entry prohibition zone, and wherein the entry prohibition zone is set in an approximately rectangular shape, and wherein, when the object is located on a curved road, in the lateral regions of the speed distribution zone, the constant relative speed line is set to extend linearly and parallel to a lateral boundary line of the entry prohibition zone beside the entry prohibition zone, and wherein the curved area is set forward and rearward of the entry prohibition zone.

17. The vehicle control system as recited in claim 16, wherein the entry prohibition zone is set such that it is more enlarged as a movement speed of the object becomes higher.

18. The vehicle control system as recited in claim 16, wherein, when the vehicle is located at a position offset laterally with respect to a forward-rearward direction of the object, the speed distribution zone is set such that the constant relative speed line is set to extend along the entry prohibition zone beside the entry prohibition zone, and wherein the curved area is set forward and rearward of the entry prohibition zone only in one of the lateral regions of the speed distribution zone which is closer to the vehicle.

19. A vehicle control system which is mounted on a vehicle, the vehicle control system comprising a processor configured to:
   detect an object ahead of the vehicle, and set, in a region around the object, a speed distribution zone defining a distribution of an allowable upper limit of a relative speed of the vehicle with respect to the object in a traveling direction of the vehicle; and
   execute traveling control of preventing the relative speed from exceeding the allowable upper limit when the vehicle is located within the speed distribution zone,
   wherein the speed distribution zone is set such that the allowable upper limit of the relative speed is set to be smaller as a distance from the object becomes smaller, such that, when the object is located on a straight road, a constant relative speed line connecting points having a same value of the allowable upper limit extends linearly at lateral regions of the speed distribution zone, and such that, when the object is located on a curved road, the speed distribution zone is set to have a curved area in which a constant relative speed line is curved in conformity with a curvature of the road in at least one of lateral regions of the speed distribution zone, and wherein the allowable upper limit set with respect to the object is zero km/h when a vehicle-object distance is less than a safe distance, and quadratically increases when the vehicle-object distance is equal to or greater than the safe distance.

* * * * *